(12) United States Patent
Stewart et al.

(10) Patent No.: US 9,625,253 B2
(45) Date of Patent: Apr. 18, 2017

(54) SYSTEM AND METHOD FOR ORIENTATING SCAN CLOUD DATA RELATIVE TO BASE REFERENCE DATA

(76) Inventors: Michael Paul Stewart, Marousi (GR); Derek Lichti, Calgary (CA); Jochen Franke, Beaconsfield (AU)

( * ) Notice: Subject to any disclaimer, the term of this patent is extended or adjusted under 35 U.S.C. 154(b) by 1082 days.

(21) Appl. No.: 12/520,700

(22) PCT Filed: Dec. 20, 2007

(86) PCT No.: PCT/AU2007/001977
§ 371 (c)(1),
(2), (4) Date: Feb. 18, 2010

(87) PCT Pub. No.: WO2008/074088
PCT Pub. Date: Jun. 26, 2008

(65) Prior Publication Data
US 2010/0164951 A1    Jul. 1, 2010

(30) Foreign Application Priority Data

Dec. 20, 2006  (AU) ................... 2006907121

(51) Int. Cl.
*G06T 17/00* (2006.01)
*G01B 11/10* (2006.01)
*G06T 7/00* (2017.01)

(52) U.S. Cl.
CPC .......... *G01B 11/105* (2013.01); *G06T 7/0046* (2013.01); *G06T 2207/10028* (2013.01); *G06T 2207/30136* (2013.01)

(58) Field of Classification Search
None
See application file for complete search history.

(56) References Cited

U.S. PATENT DOCUMENTS 5,442,572 A    8/1995 Kiridena et al.
5,638,301 A    6/1997 Smith et al.
(Continued)

FOREIGN PATENT DOCUMENTS

AU    777636 B2    10/2004
EP    0875751 A1    11/1998
(Continued)

OTHER PUBLICATIONS

Nelson et al. (Nelson, Peter, et al., "Introductory Statistics for Engineering Experimentation", Burlington, MA, Academic Press, 2003).*
(Continued)

*Primary Examiner* — William Beutel
(74) *Attorney, Agent, or Firm* — Armstrong Teasdale LLP

(57) ABSTRACT

A system for orientating scan cloud data of a surface relative to base reference data is provided. The orientating system includes an input source generator adapted to provide the scan cloud data, a tilt-correction means for orientating the point cloud data relative to the base reference data, and a data editing means for filtering spurious point data from the accumulated point cloud data, wherein the base reference data represents at least geometrical parameters of a base reference, the base reference being substantially distinct from the target surface. A system for identifying features in scan could data of a surface is also provided. The identifying system includes an input source generator adapted to provide the scan cloud data, and a partitioning means for partitioning the point cloud data into discrete segments corresponding to different geometric sections of the surface.

14 Claims, 16 Drawing Sheets

(56) References Cited

U.S. PATENT DOCUMENTS

| | | | |
|---|---|---|---|
| 5,848,115 A * | 12/1998 | Little et al. | 378/4 |
| 6,016,147 A | 1/2000 | Gantt | |
| 6,646,641 B1 | 11/2003 | White et al. | |
| 7,111,783 B2 * | 9/2006 | Xi et al. | 235/437 |
| 7,277,187 B2 * | 10/2007 | Smith et al. | 356/601 |
| 7,639,253 B2 * | 12/2009 | Bae et al. | 345/427 |
| 7,689,032 B2 * | 3/2010 | Strassenburg-Kleciak | G01C 15/00 382/154 |
| 2002/0145607 A1 * | 10/2002 | Dimsdale | 345/423 |
| 2002/0158368 A1 | 10/2002 | Wirth, Jr. | |
| 2004/0001620 A1 * | 1/2004 | Moore et al. | 382/154 |
| 2004/0056217 A1 | 3/2004 | Harvill et al. | |
| 2004/0254758 A1 * | 12/2004 | Chang | 702/155 |
| 2005/0018901 A1 * | 1/2005 | Kaufmann et al. | 382/154 |
| 2005/0128197 A1 * | 6/2005 | Thrun et al. | 345/421 |
| 2007/0160284 A1 | 7/2007 | Kaufmann et al. | |
| 2008/0021502 A1 * | 1/2008 | Imielinska et al. | 607/1 |

FOREIGN PATENT DOCUMENTS

| | | |
|---|---|---|
| EP | 1176393 A2 | 1/2002 |
| EP | 1662228 A1 | 5/2006 |
| WO | 03094102 A1 | 11/2003 |
| WO | 2006121457 A2 | 11/2006 |
| WO | 2007000010 A1 | 1/2007 |
| WO | 2007056768 A2 | 5/2007 |

OTHER PUBLICATIONS

Liu et al. (Liu, Xin, et al. "Symmetry Identification Using Partial Surface Matching and Tilt Correction in 3D Brain Images", Proceedings of the 28th IEEE EMBS Annual International Conference, NY, Aug. 30-Sep. 3, 2006.).*

Lichti; Error modelling, calibration and analysis of an AM-CW terrestrial laser scanner system; ISPRS Journal of Photogrammerty & Remote Sensing, vol. 61, Issue 5, Jan. 2007; pp. 307-324; published on-line Nov. 22, 2006 (20 pages).

Bae et al. On-site self-calibration using planar features for terrestrial laser scanners, Proceedings of the ISPRS Workshop 'Laser Scanning 2007' and 'SliviLaser 2007', (online), Espoo, Sep. 12-14, 2007; Finland, ISSN 1682-1777 (retrieved on Jan. 22, 2007). Retrieved from the Internet: http://www.commission3.isprs.org/laser07/final_papers/Bae 2007.pdf. (6 pages).

Mill Liner Wear Inspection by Laser Scanning, Nov. 2004, 12 pages, Curtin University of Technology.

Email from Tage Moller dated Nov. 30, 2004, "Mill liner wear assessment by laser scanning", 2 pages.

Cole, David M. et al., "Using Laser Range Data for 3D SLAM in Outdoor Environments", IEEE International Conference on Robotics and Automation, Jun. 2006, 8 pages.

Gerth, Richard J., "Virtual Functional Build for Body Assembly", Proceedings of IMECE2005, 2005 ASME International Mechanical Engineering Congress and Exposition, Nov. 5-11, 2005, 10 pages.

Balzani, M. et al., "CYRAX 2500 Laser Scanner and G.P.S. Operational Flexibility: From Detailed Close Range Surveying, to Urban Scale Surveying", Proceedings of the CIPA WG 6 International Workshop on Scanning for Cultural Heritage Recording, Sep. 1-2, 2002, pp. 27-32.

Sebring, R. et al., "Non-Contact Optical Three Dimensional Liner Metrology", 6 pages, available at <http://lib-www.lanl.gov/la-pubs/00818414.pdf>, Proceedings of 28th IEEE International Conference on Plasma Science/13th IEEE International Pulsed Power Conference, Jun. 2001.

Kamppari, Ari, "Use of FARO Arm Measuring Arm", Final Thesis, Jan. 1999, 62 pages, Tampere University of Applied Sciences.

Franke, Jochen et al., "Millmapper: A New Tool for Grinding Mill Thickness Gauging", SAG 2006, Department of Mining Engineering, University of British Columbia, 7 pages.

Scanalyse Pty Ltd: 3D Laser Scanning for the Mining Industry, CRCSI Newsletter Article 2007, 4 pages.

"PolyWorks: 3D Scanner and 3D Digitizer Software from InnovMetric Software, Inc.," <https://web.archive.org/web/20061016054644/http://www.innovmetric.com/Manufacturing/cu_success.aspx>, 12 pages, Oct. 16, 2006.

"PolyWorks/Inspector V8 to Offer Advanced GD&T and Soft Gauging Capabilities for Point Cloud Based Inspection and Dimensional Measurements," <https://web.archive.org/web/20061101202254/http://www10.mcadcafe.com/nbc/articles/view_article.php?section=CorpNews&articleid=76919>, 3 page.

"Realworks Survey Software Technical Notes," www.trimble.com, 2005, 8 pages.

"ILRIS-3D—One Tool, Multiple Uses: Mine Safety, Volume Calculation, Change Detection", Optech Field Notes, 2006, 2 pages.

Dusharme, Dirk, "3-D Inspection a Look at Technologies for Automotive 3-D Measurement," <https://web.archive.org/web/20061113134918/http://www.qualitydigest.com/june06/articles/01_article.shtml>, 5 pages.

Shah, Tahir Rabbani, "Automatic Reconstruction of Industrial Installations Using Point Clouds and Images", Publications on Geodesy 62, May 2006, 175 pages, NCG, Nederlandse Commissie voor Geodesie.

Boehler, Wolfgang et al., "3D Scanning Software: An Introduction", 5 pages, available at https://i3mainz.hs-mainz.de/sites/default/files/public/data/p11_Boehler.pdf, Proceedings of the CIPA WG 6 International Workshop on Scanning for Cultural Heritage Recording, 2002.

Besl, Paul J. et al., "A Method for Registration of 3-D Shapes", IEEE Transactions on Pattern Analysis and Machine Intelligence, Feb. 1992, pp. 239-256, vol. 14, No. 2.

Gruen, Armin et al., "Least Squares 3D Surface and Curve Matching", ISPRS Journal of Photogrammetry and Remote Sensing 59 (3), 2005:151-174, 31 pages.

Jain, Varun et al., "Point Matching Methods: Survey and Comparison", Fall 2004, available at http://citeseerx.ist.psu.edu/viewdoc/download?doi=10.1.1.94.8596&rep=rep1&type=pdf, 16 pages.

Cheok, Geraldine S. et al., "NIST Construction Automation Program Report No. 4: Non-Intrusive Scanning Technology for Construction Status Determination", Jan. 2000, 103 pages, NISTIR 6457.

Gordon, Stuart et al., "Application of a High-Resolution, Ground-Based Laser Scanner for Deformation Measurements", 10th FIG International Symposium on Deformation Measurements, Mar. 19-22, 2001, pp. 23-32.

Jacobs, Geoff, "Extracting Points, Lines, Surfaces, Features & Models from Point Clouds", Professional Surveyor Magazine, Sep. 2004, 6 pages.

Lichti, D.D. et al., "Ground-Based Laser Scanners: Operation, Systems and Applications", GEOMATICA, 2002, pp. 21-33, vol. 56, No. 1.

Bohm, Jan, "Terrestrial Laser Scanning—A Supplementary Approach for 3D Documentation and Animation", Photogrammetric Week 05, 2005, pp. 263-271.

Laboureux, Xavier et al., "Localization and Registration of Three-Dimensional Objects in Space—Where are the Limits?", Applied Optics, Oct. 10, 2001, pp. 5206-5216, vol. 40, No. 29.

Guarnieri, A. et al., "Digital Photogrammetry and TLS Data Fusion Applied to Cultural Heritage 3D Modeling", Commission V, Working Group 3, 6 pages, available at http://3dom.fbk.eu/sites/3dom.fbk.eu/files/pdf/Guarnieri_etal_ISPRSV06.pdf, Proceedings of the ISPRS, Commission V Symposium, 'Image Engineering and Vision Vletrology', Sep. 25-27, 2006.

Van Gosliga, Rinske et al., "Deformation Analysis of a Bored Tunnel by Means of Terrestrial Laser Scanning", ISPRS Commission V Symposium 'Image Engineering and Vision Metrology', Sep. 25-27, 2006, pp. 167-172, vol. XXXVI, Part 5.

Nordell, Lawrence K. et al., "Comminution Simulation Using Discrete Element Method (DEM) Approach—From Single Particle Breakage to Full-Scale SAG Mill Operation", SAG 2001, Mining and Mineral Process Engineering, University of British Columbia, pp. IV-235-251.

* cited by examiner

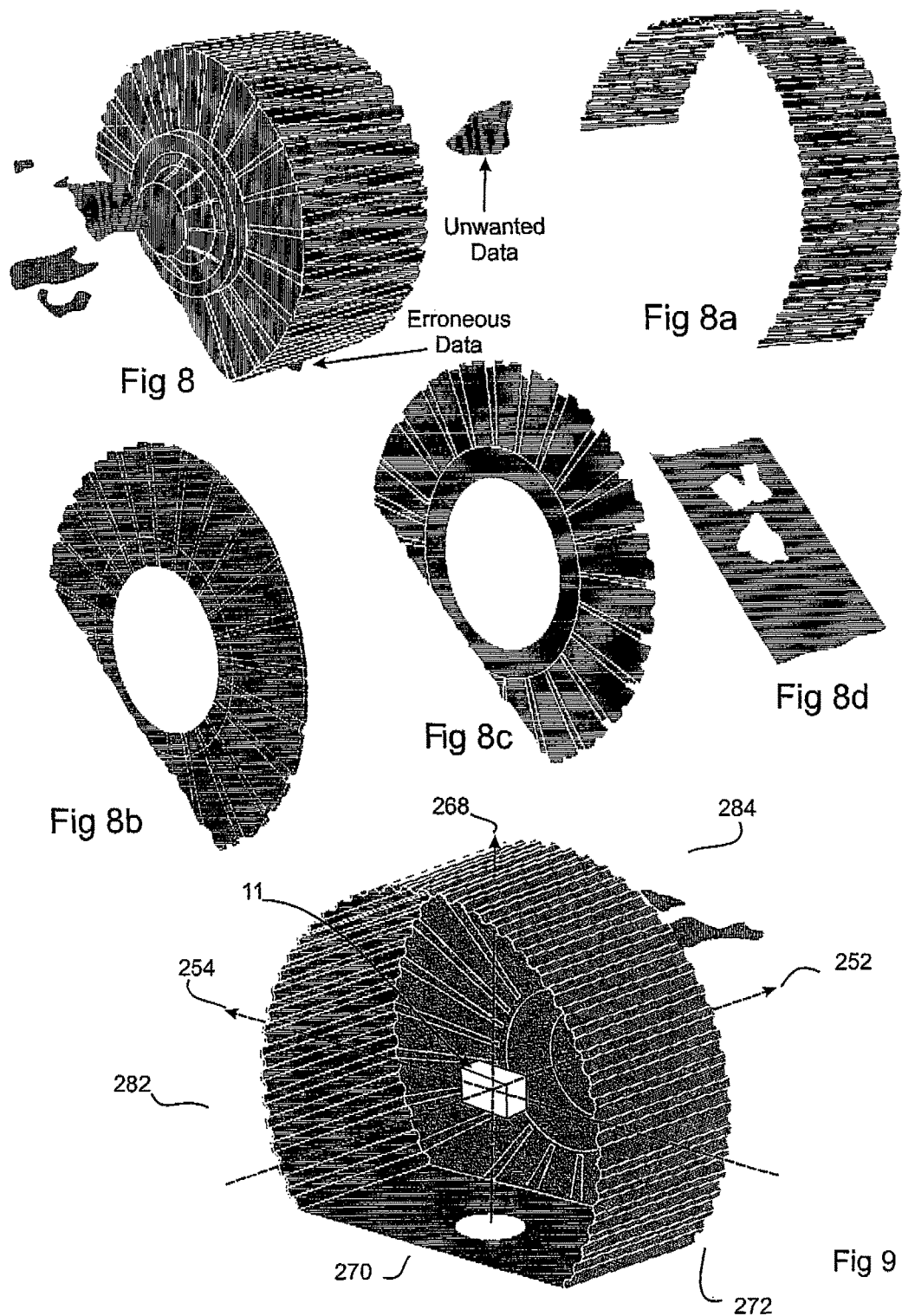

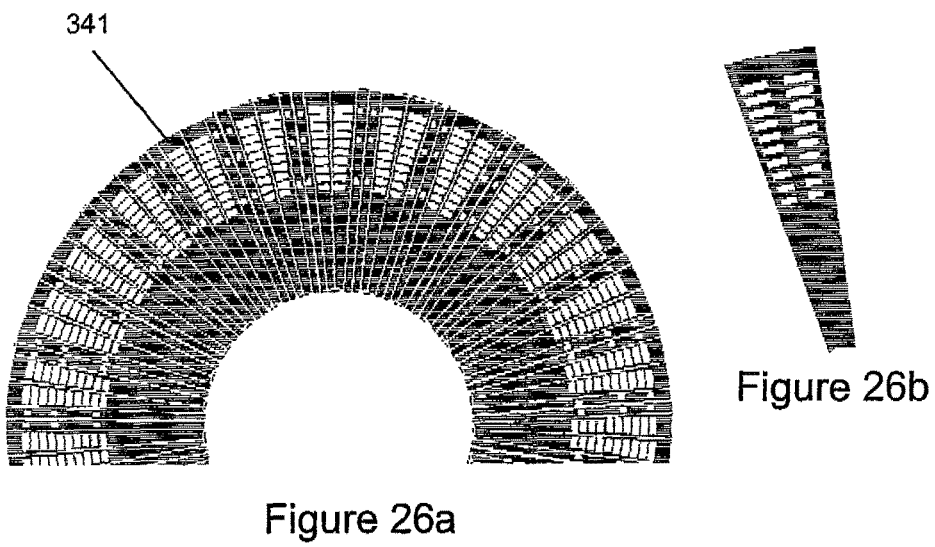
Figure 26a
Figure 26b
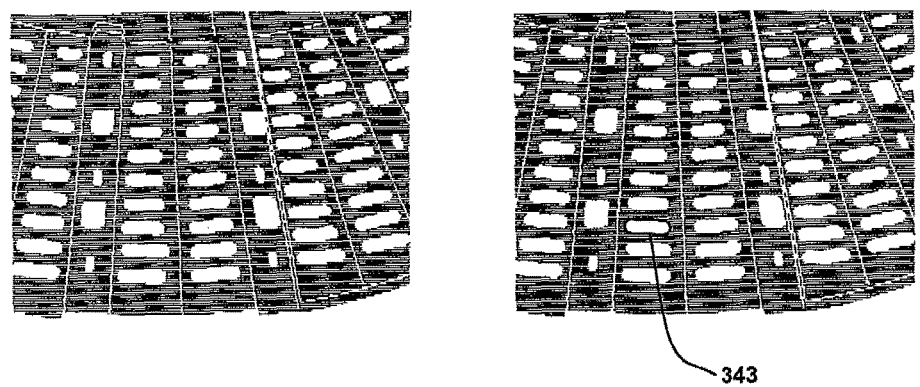
Figure 27a
Figure 27b

SYSTEM AND METHOD FOR ORIENTATING SCAN CLOUD DATA RELATIVE TO BASE REFERENCE DATA

CROSS-REFERENCE TO RELATED APPLICATIONS

This application claims priority to and the benefit of the filing date of PCT International Patent Application Number PCT/AU2007/001977, filed Dec. 20, 2007, which is incorporated by reference in its entirety.

FIELD OF THE INVENTION

The present invention relates to scanning systems and methods for orientating scan cloud data relative to base reference data. The invention has particular, although not exclusive, utility for measuring surfaces where the alignment of the scan cloud data relative to the base reference data is unknown. It is also relevant to identifying features in scan cloud data of a surface via the use of a partitioning means.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

The following discussion of the background art is intended to facilitate an understanding of the present invention only. The discussion is not an acknowledgement or admission that any of the material referred to is or was part of the common general knowledge as at the priority date of the application.

The applicant has previously disclosed a system for measuring and mapping a surface relative to a reference surface in the publication WO 2007/000010. The system, amongst other things, provides the use of a scanner to gather scan cloud data, and then measure and map that scan cloud data relative to a reference surface, which in the specific embodiments described, is the internal surface of a rotating cylindrical mill. As disclosed therein, despite the scanner being placed as close to the centre of the mill as possible, the positioning will never be exact. Accordingly, the base reference data and the scan cloud data need to be aligned with the greatest degree of accuracy as is achievable.

In the comminution of minerals within the mining industry, the crushed ore is separated into pieces and may then be fed into rotating cylindrical mills. The rotation of a mill about its axis causes the ore pieces to tumble under gravity, thus grinding the ore into decreasingly smaller fractions. Some types of grinding mills are fitted with secondary grinding systems such as iron or steel balls (ball mills), steel rods (rod mills) or flint pebbles (pebble mills) which assist in the grinding process.

The accurate measurement of wear in a mill is particularly important, as the cost of incorrectly predicting which liners to replace is great. If the nature of the wear can be identified accurately, wear patterns may also be identified to optimise the operation of the mill.

Other measurements, such as the volume of the secondary grinding system, the size of the components thereof, and the size of screening systems within a discharge arrangement, are also difficult to measure.

Current means of measuring the ball charge volume are achieved using hand held tape measures, to measure the distance from the surface of the ball charge to some estimated longitudinal central axis; and to measure the diagonal distance across the surface from one corner to the other.

These measurements are then used to calculate a volume using simple geometry. A problem with this methodology is the fact that the surface is never perfectly flat and the base reference data is not known. For example, the liners covered by a ball charge are ill defined. Unless the reference plane, above which the surface of a ball charge sits, is known precisely, the calculation of ball charge volume will inevitably be inaccurate.

The volume of the ball charge is an important factor in achieving optimum grinding and production from a mill. A variation of only 4% from the optimum ball charge has been reported to reduce throughput by between 5% and 10%. Improving the accuracy of this measurement will improve the level of control and performance of the mill.

Furthermore, there is no known method to determine what proportion of the remaining objects in a mill are attributable to the materials being ground as opposed to the objects of the secondary grinding system. One method to measure the ratio of steel balls to ore is to empty the mill, separate the components, and weigh them. Another known method is to monitor the gross mass flows of ore, water and balls into the mill. However it is difficult to separate out these components from each other in exit streams, so the best result achieved is a rough estimation. The ratio of ball to ore is very important for the optimum performance of the mill. If there is too much ore then the balls take more time to crush it to the correct size and throughput is limited. If there are too many balls relative to the ore they risk impacting on bare liners and dramatically increasing wear rates.

In the case of measuring the size of the components or objects that make up a secondary grinding system, there is no optimal method to measure their individual size. In a ball grinding system, the only known way to measure the size of these balls is to physically remove them from the mill and, as previously mentioned, individually measure them. This is impractical in an operational mill, due to the significant downtime incurred.

Balls can be added to mills on a daily basis and the quantity and size are a critical performance parameter. Ball size is important because as balls wear and reduce in size their impact power is reduced and they are less effective in breaking down rocks. Typically when the diameter of a sphere has been reduced to its half original size the mass will be reduced by a factor of 8. At this point the steel ball is considered ineffective and simply occupies valuable space in the mill, limiting production. Smaller balls will also produce a finer product and the design of the mineral liberation system downstream of the mill is highly sensitive to product grind size. The matching of ball size to product sizing and the control of these parameters is often critical to the yield of the resulting mineral.

Finally, measuring the size of screening system employed in a mill is important in order to gauge the performance of the mill. Grates constituting the screening system hold back the grinding media. As grate holes wear they will allow larger grinding media through and reduce the effectiveness of the grinding process. The only known method of measuring these grates is to manually enter the mill and measure the grate holes individually. Typically there are several hundred grate holes in each mill. Given the repetitive nature of the tasks of manually measuring hundreds of grates, the process is also highly susceptible to human error.

DISCLOSURE OF THE INVENTION

It is an object of the present invention to ameliorate, mitigate or overcome, at least one of the aforementioned problems associated with prior art mill measurement, or to at least provide the public with a useful choice in an alternative system for mill measurement.

It should be appreciated with the above object said, however, the present invention is in no way limited solely to application with mill liner measurement and may have other applications as discussed elsewhere in the specification.

In accordance with one aspect of the present invention, there is provided a system for orientating scan cloud data of a target surface relative to base reference data including an input source generator adapted to provide said scan cloud data; a tilt-correction means for orientating said point cloud data relative to the base reference data; and a data editing means to filter spurious point data from the accumulated point cloud data, wherein the base reference data represents at least critical geometrical parameters of a base reference, the base reference being substantially distinct from the target surface.

Preferably, the base reference data includes key reference data to describe the geometry of the base reference.

Preferably, the target surface and the base reference are referenced to their own respective co-ordinate system.

Preferably, the base reference represents a contained space.

Preferably, the contained space is bounded by a substantially cylindrical shell with opposing ends.

Preferably, the base reference further includes critical parameters defining the location of the central longitudinal axis of the shell, the radius of the shell, and the length of the cylindrical portion of the shell.

Preferably, the data editing means further includes partitioning means to partition said point cloud data into discrete segments corresponding to different geometric sections of said surface.

Preferably, the data editing means is adapted to operate prior to the tilt-correction means.

Preferably, the data editing means includes at least one or more of the following processes: (i) a scanner structure filter to remove points attributable to any supporting means used to situate, stabilise or protect the scanning means; (ii) an intensity filter to remove any point in the accumulated point cloud data above a threshold intensity value; and (iii) a range filter to remove any point less than a minimum or greater than a maximum threshold in the accumulated point cloud data.

Preferably, the said base reference data includes radius and length variables, and wherein said range filter derives the threshold from said radius and said length.

Preferably, the tilt-correction means includes a point cloud data orientation means, wherein said point cloud data orientation means includes: a temporary point removal means for temporarily removing points that are substantially longitudinally parallel with points removed by the scanner structure filter; a rotation values means to calculate rotation values to be applied to the scan cloud data; a scan cloud data rotation process; and a point restoration means whereby points removed by the temporary point removal means are restored to the accumulated point cloud data.

Preferably, the point cloud data orientation means includes a rotation value software utility including: a translator process to translate the scan cloud data using a centroid reduction $$\begin{pmatrix} x' \\ y' \\ z' \end{pmatrix}_i = \begin{pmatrix} x \\ y \\ z \end{pmatrix}_i - \begin{pmatrix} \bar{x} \\ \bar{y} \\ \bar{z} \end{pmatrix} \text{ where } \begin{pmatrix} \bar{x} \\ \bar{y} \\ \bar{z} \end{pmatrix} = \frac{1}{n} \sum_{i=1}^{n} \begin{pmatrix} x \\ y \\ z \end{pmatrix}_i,$$

and a calculator process to determine rotation values via eigenvalue decomposition of the covariance matrix of the scan cloud data $$\Lambda = MCM^T \text{ where } C = \sum_{i=1}^{n} \begin{pmatrix} x' \\ y' \\ z' \end{pmatrix}_i (x' \ y' \ z')_i.$$

Preferably, the rotation value software utility is adapted to rotate the accumulated scan cloud data, the rotation value software utility including: a rotation process to rotate values so that the x-longitudinal, y-transverse, and z-height axes coincide $$\begin{pmatrix} x'' \\ y'' \\ z'' \end{pmatrix}_i = M \begin{pmatrix} x' \\ y' \\ z' \end{pmatrix}_i$$

where M is a rotation value calculated by the rotation values means.

Preferably, the tilt-correction means includes a tilt-correction software utility for determining and correcting any residual tilt in the accumulated scan cloud data about an axis including: an extractor process to extract a temporary set of points, p, within a set of constraints, $$|x_i| < t_x, \ |y_i| < t_y, \ z_i > t_z,$$

a subtracter process to substract a mean x co-ordinate from the temporary set of points, $$x'_i = x_i - \bar{x} \text{ where } \bar{x} = \frac{1}{p} \sum_{i=1}^{p} x_i,$$

forming the following 2D line equation for each point in the resulting temporary set of points:

$$z_i = mx'_i + b,$$

a least-squares calculator to calculate the least-squares estimate of the slope, m. as:

$$m = \frac{\sum_{i=1}^{p} z_i x'_i}{\sum_{i=1}^{p} (x'_i)^2},$$

a rotate angle calculator process to calculate a rotation angle, ϕ, as:

$$\phi = \arctan(m),$$

an accumulated scan point rotation process to rotate the accumulated scan point data:

$$\begin{pmatrix} x' \\ y' \\ z' \end{pmatrix}_i = R_2(\varphi) \begin{pmatrix} x \\ y \\ z \end{pmatrix}_i \text{ where } R_2(\varphi) = \begin{pmatrix} \cos\varphi & 0 & -\sin\varphi \\ 0 & 1 & 0 \\ \sin\varphi & 0 & \cos\varphi \end{pmatrix}.$$

Preferably, the base reference is a substantially cylindrical shell and said key reference data are the critical parameters that describe the geometry of the base reference, wherein said partitioning means includes at least one or more of the following processes: (i) an opposing-end segmentation means wherein said opposing-end segmentation means includes at least one or more of the following processes: a) a planar-end segmentation means to segment points in the accumulated point cloud data when said base reference data denotes a substantially planar end; and b) a conical-end segmentation means to segment points in the accumulated point cloud data when said base reference data denotes a substantially conical end. (ii) a floating-object segmentation means to segment points in the accumulated point cloud data attributable to objects that are non-fixably connected to said surface; and (iii) a belly segmentation means to segment points in the accumulated point cloud data attributable to said cylindrical shell.

Preferably, the planar-end segmentation means and conical-end segmentation means includes an end segmentation software utility comprising: a frequency calculator process to calculate the frequency of each longitudinal co-ordinate within the accumulated point cloud data; a greatest frequency calculator process to determine the greatest said frequency of positive and negative longitudinal co-ordinates; a threshold addition process to add a threshold value to said greatest negative and positive frequency values; and whereby said conical-end segmentation means further comprises: a minima locations calculator process to scan said longitudinal co-ordinate frequencies to determine minima locations from said greatest negative and positive frequency values as towards the location of said scanner; a segmentation process to segment the points in the accumulated point cloud data attributable to the planar ends according to said minima locations; and whereby said conical-end segmentation means uses the greatest negative and positive frequency values of the minima locations calculator process to segment the points in the accumulated point cloud data attributable to the conical ends.

Preferably, the system further includes a non-fixably connected volume measurement means, to measure the volume of objects that are non-fixably connected to said surface.

Preferably, the system further includes a hole measurement means to measure the size of apertures in said surface.

Preferably, the non-fixably connected volume measurement means further comprises a ball-ore discrimination means to measure the ratio of a set of balls to non-ball materials.

Preferably, the non-fixably connected volume measurement means further comprises a ball size measurements means to measure the size of a set of balls within the cylindrical shell.

Preferably, the floating-object segmentation means includes a floating-object software utility that operates after the opposing-end segmentation means has been effected on the scan cloud data, the floating-object software utility including: a radius frequency calculator process to calculate the frequency of each cylindrical radius value in accumulated scan cloud data, a peak value determinative process to determine a peak value of the frequencies of cylindrical radii and segmenting points based on the peak value, a segmentation fitting process to fit all segmented points to a plane by eigenvalue-based decomposition, a scan cloud translation process to translate scan cloud data of m points to a centroid $$\begin{pmatrix} x' \\ y' \\ z' \end{pmatrix}_i = \begin{pmatrix} x \\ y \\ z \end{pmatrix}_i - \begin{pmatrix} \overline{x} \\ \overline{y} \\ \overline{z} \end{pmatrix} \text{ where } \begin{pmatrix} \overline{x} \\ \overline{y} \\ \overline{z} \end{pmatrix} = \frac{1}{n} \sum_{i=1}^{n} \begin{pmatrix} x \\ y \\ z \end{pmatrix}_i,$$

an eigenvalue decomposition process to determine the eigenvalue decomposition of a covariance matrix $$\Lambda = MCM^T \text{ where } C = \sum_{i=1}^{n} \begin{pmatrix} x' \\ y' \\ z' \end{pmatrix}_i (x' \ y' \ z')_i,$$

a plane model is given by $ax+by+cz-d=0$ where $(a, b, c)$ are the elements of the eigenvector corresponding to the smallest eigenvalue, and $$d = (a \ b \ c) \begin{pmatrix} \overline{x} \\ \overline{y} \\ \overline{z} \end{pmatrix},$$

a residual deviation calculation process to calculate the residual deviation, v, from the best-fit plane for each point:

$ax_i+by_i+cz_i-d=v_i$, and a points discardal process to discard points above the plane based on the standard deviation of residuals.

Preferably, the belly segmentation means includes a belly segmentation software utility including: a centroid refiner process to refine the centroid of point cloud on the longitudinal axis by calculating the mean value at either end of the substantially cylindrical shell using an equal number of points $$\overline{x}_L = \frac{1}{p^-} \sum_{i=1}^{p^-} x_i^- \text{ such that } \frac{p^-}{n} \geq t_p,$$

and $$\overline{x}_R = \frac{1}{p^+} \sum_{i=1}^{p^+} x_i^+ \text{ such that } \frac{p^+}{n} - \frac{p^-}{n} \leq t,$$

where − and + refer to points from the left and right ends of the belly liner point cloud, respectively, a scan cloud translation process to translate the entire scan cloud data by the mean of these two means $$x_i' = x_i - \overline{x} \text{ where } \overline{x} = \frac{\overline{x}_L + \overline{x}_R}{2},$$

a cylindrical definition process to define a circle at each end of the substantially cylindrical shell, the circle being the circle of intersection of cylindrical belly surface of the base reference data and the conical or planar end surface of base reference data, a cone definition process to define a cone with this circle as the base and apex on the belly side of the circle having half-apex angle of 45°, and a point assignment process to assign within the cone to a given end of the substantially cylindrical shell and to assign each point outside of the code to the cylindrical shell.

Preferably, the belly segmentation means includes a cylinder-fit process, wherein the cylinder-fit process includes a cylinder-fit software utility that operates after the opposing-end segmentation means and the floating-object segmentation means have been effected on the scan cloud data, the cylinder-fit software utility includes: an equation forming process to form the following equation for each point in the accumulated scan cloud data $\|(\bar{p}_i - \bar{q}) \times \bar{n}\| - r = 0$ where the observation point vector is given by $\bar{p}_i = (x_i \ y_i \ z_i)^T$, the cylinder position vector is given by $\bar{q} = (0 \ y_c \ z_c)^T$, and the cylinder axis vector is given by $\bar{n} = (a \ b \ c)^T$, a weighted constraint addition process to add the weighted constraint $a^2 + b^2 + c^2 - 1 = 0$ and solving in parametric least squares, a cylinder position translation process to translate the entire scan point cloud by the cylinder position vector $$\begin{pmatrix} x' \\ y' \\ z' \end{pmatrix}_i = \begin{pmatrix} x \\ y \\ z \end{pmatrix}_i - \begin{pmatrix} 0 \\ y_c \\ z_c \end{pmatrix},$$

a rotation value calculator process to calculate the rotation angles, $\phi$ and $\kappa$, $$\varphi = \arctan\left(\frac{c}{a}\right) \text{ and } \kappa = \arctan\left(\frac{-b}{a}\right),$$

and a scan cloud transformation process to transform the entire point cloud $$\begin{pmatrix} x'' \\ y'' \\ z'' \end{pmatrix}_i = M^T \begin{pmatrix} x' \\ y' \\ z' \end{pmatrix}_i \text{ where } M = R_3(\kappa)R_2(\varphi).$$

In accordance with another aspect of the invention, there is provided a system for identifying features in scan cloud data of a surface comprising an input source generator adapted to provide said scan cloud data; and a partitioning means to partition said point cloud data into discrete segments corresponding to different geometric sections of said surface.

Preferably, the system further includes a non-fixably connected volume measurement means, to measure the volume of objects that are non-fixably connected to said surface.

Preferably, the system further includes a hole measurement means to measure the size of apertures in said surface.

Preferably, the non-fixably connected volume measurement means further comprises a ball-ore discrimination means to measure the ratio of a set of balls to non-ball materials.

Preferably, the non-fixably connected volume measurement means further comprises a ball size measurements means to measure the size of a set of balls within a cylindrical shell.

In accordance with a further aspect of the invention, there is provided a method for orientating scan cloud data of a surface relative to base reference data according to the system described in a preceding aspect of the invention.

In accordance with a still further aspect of the invention, there is provided a method for identifying features in scan cloud data of a surface according to the system described in a preceding aspect of the invention.

BRIEF DESCRIPTION OF THE DRAWINGS

The accompanying drawings illustrate particular features of specific embodiments of the best mode for carrying out the present invention, wherein:

FIG. 8 represents a 3D image showing a typical set of points in the received scan cloud data from the scanner.

FIGS. 8a-8d represent 3D images of the resulting segmented output from the data editing means.

FIG. 9 represents a sectional view of a typical mill with a laser scanner placed approximately at its centre.

FIGS. 26a and 26b depict a discharge end liner with grate holes to allow crushed ore to pass through, and a portion thereof respectively.

FIGS. 27a and 27b represent a point cloud scan of a portion of a discharge end, and the same portion with detected edges for one grate hole.

BEST MODE(S) FOR CARRYING OUT THE INVENTION

Figure 1:
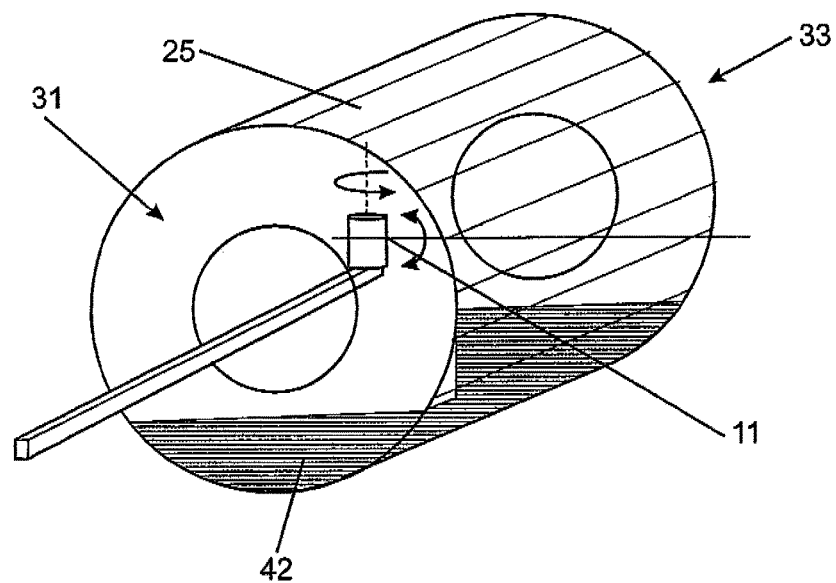
FIG. 1 shows an example instance of gathering scan cloud data using an input source generator in the form of a laser scanner and boom arrangement.
Figure 2:
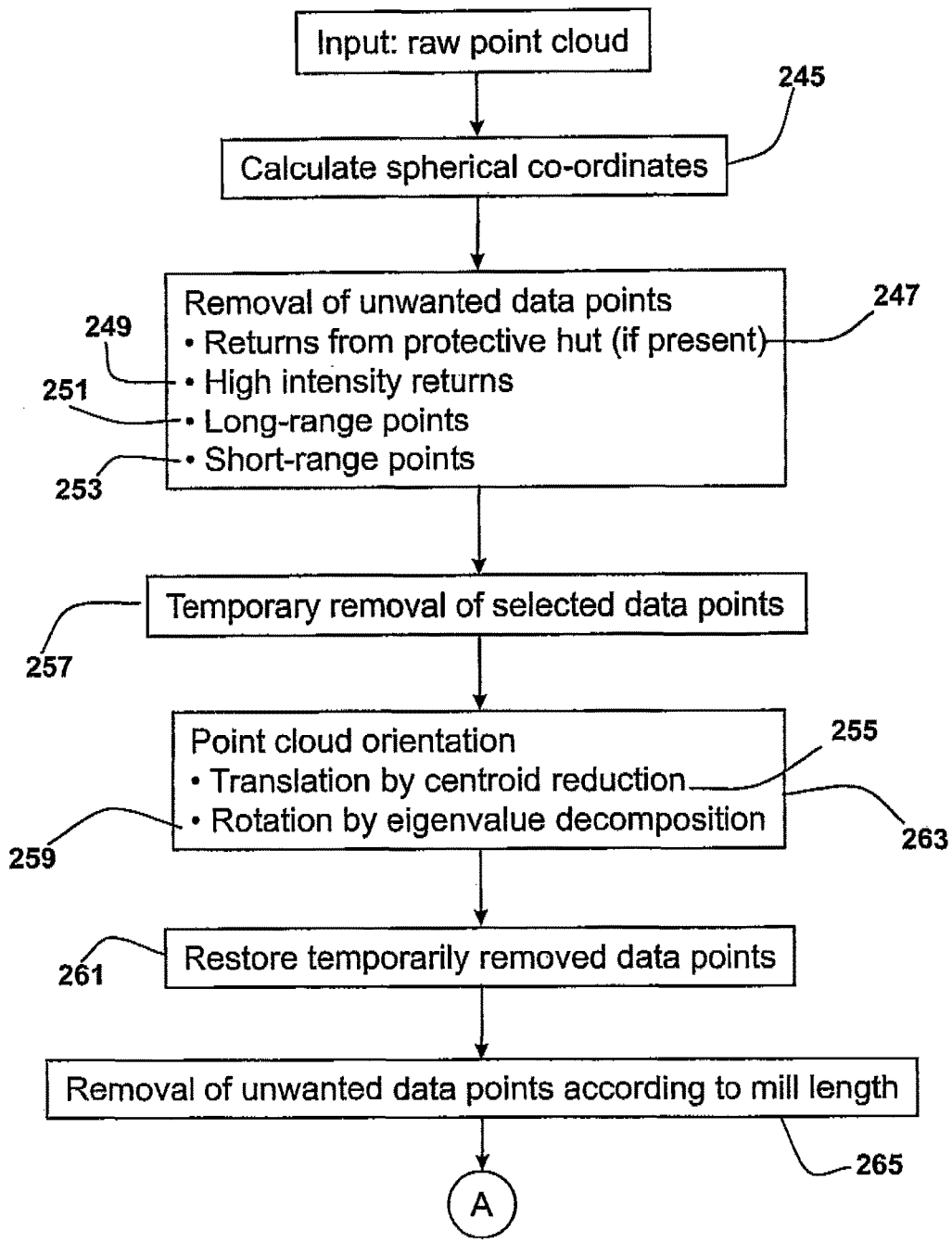
FIGS. 2 to 7 show a data editing means and transformation processors components of the software.

The best mode for carrying out the invention will now be described with reference to one specific embodiment thereof and several other alternative embodiments. The description of the specific embodiment makes reference to the accompanying drawings. Accordingly reference numerals referred to herein are used in the drawings to show the corresponding feature described in the embodiment.

The specific embodiment is directed towards measuring wear of mill liners in a rotating cylindrical mill used in the comminution of minerals within the mining industry.

The replacement of mill liners is a costly, but necessary, task associated with the operation of a rotating cylindrical mill. As disclosed in WO 2007/000010, and included herein with reference to FIG. 1, an input source generator can be adopted in the form of first gathering scan cloud data using a laser scanner 11 from a mill having a cylindrical shell 25, the shell having a feed end 31 and a discharge end 33. The scan cloud data may then be secondly stored in a database or other suitable digital storage medium. A transformation processor, forming part of a data processing system, then accesses the scan cloud data generated by the input source generator, as would be appreciated by a person skilled in the art.

The base reference data may be obtained from a CAD model of the mill or from a scanning of the internal shell without the liners in place, and thus is referenced to its own co-ordinate system, the X-axis of which is defined by the longitudinal axis of the mill. Thus the base reference data is characterised by key reference data comprising critical mill parameters that describe the geometry of the base reference of the mill, namely the shell radius and the length of the cylindrical portion of the shell.

For mills with conical rather than planar ends, the cone angle relative to the cylinder axis and distance between feed and discharge end apexes also constitute key reference data.

The base reference data for the mill, as stored in the database, is then correlated with the displacement data obtained from the laser scanner by the transformation processor.

The reason for this is that the co-ordinate system of the displacement data obtained by the laser scanner is referenced to the reference point of the laser scanner, whereas the base reference data for the mill is referenced to its own co-ordinate system related to the geometry of the mill. Therefore in order to derive accurate displacement data indicative of the mill liner segment thickness at any particular point, the two sets of data need to be correlated. Accordingly, an important aspect of the transformation processor is to provide for this correlation.

Since the laser scanner 11 collects data in a near spherical field of view, the raw point cloud data also contains spurious points from outside the mill, collected when the laser beam passes through the various holes in the feed and discharge ends. These unwanted points are first filtered out from the accumulated point cloud data by a data editing means, which also forms part of the data processing system.

The base reference data usually represents a substantially cylindrical shell with opposing ends and said critical parameters including the location of the central longitudinal axis of the shell; the radius of the shell; and the length of the cylindrical portion of the shell.

The operation of the data editing means is outlined as a flowchart in FIGS. 2-7. The flow chart of the data editing means of this embodiment begins at FIG. 2.

A visual depiction of the scan cloud data input into, and resulting output from, the data editing means is provided in FIGS. 8 and 8a-8d respectively.

The data editing means uses a co-ordinate transformation software utility to effect the creation of a spherical co-ordinate for each point in the accumulated point cloud data, said co-ordinate translation software utility comprising a rotation process to translate each point. The transformation software utility bases its calculations on Cartesian co-ordinate for each said point at 245. For each point, the spherical co-ordinate is calculated as follows:

$$\rho_i = \sqrt{x_i^2 + y_i^2 + z_i^2}$$
$$\theta_i = \arctan\left(\frac{y_i}{x_i}\right)$$
$$\alpha_i = \arctan\left(\frac{z_i}{\sqrt{x_i^2 + y_i^2}}\right)$$

As the protective but 240 obstructs the scanner's field of view, the points of the scan cloud data attributable to this structure need to be isolated and removed at 247. This includes both the but roof and the support beams used to support the but roof. A scanner structure filter is employed to isolate and remove these points. One type of scanner structure filter is to use a method of isolating and removing the protective but 240 scan points at 247 by defining horizontal and vertical angle thresholds that correspond with the geometry of the protective but 240. Using the spherical co-ordinates of the scan cloud data, the following method can then be used to remove the erroneous points attributable to the protective but 240 at 247:

$$\alpha_i > t_\alpha$$

The following tolerances remove points from the supports for the roof and are applied on the basis of horizontal direction angle at 247:

$$-t_{\theta_1} < \theta_i < -t_{\theta_2} \text{ (to remove points near } \theta=0°)$$

$$-t_{\theta_3} < \theta_i < -t_{\theta_4} \text{ (to remove points near } \theta=180°)$$

The distance variable measured by laser scanners can be inaccurate. One determinate of accuracy is the intensity of a given point. To improve the accuracy of the resulting scan cloud data, an intensity filter is utilised. One type of intensity filter is to remove all points which are greater than a user-defined threshold intensity value at 249:

$$I_i > t_I$$

The data editing means also uses a range filter to remove points that do not reside within a defined distance range. One type of range filter is to remove points within the scan cloud data by comparing the measured range with a maximum at 251 and minimum at 253 threshold derived from the mill radius and mill length of the base reference data:

$$\rho_i > t_{\rho_{max}}$$

$$\rho_i < t_{\rho_{min}}$$

The system uses a point cloud data orientation means to improve the accuracy of later described processes. Firstly, a temporary point removal means is utilised in the instance that a protective but 240 has been utilised. One type of temporary point removal means is to temporarily remove a segment of the scan cloud data based on the outer-circumferential boundaries of the points that were previously removed to allow for the presence of the but supports 244 at 247. In this embodiment, this is achieved by temporarily removing the points that are substantially longitudinally parallel to the points that were previously removed to allow for the presence of the but supports 244 at 247. Accordingly, all points within a user-defined transverse co-ordinate range are temporarily removed:

$$-t_y < y_i < t_y$$

Figure 12:
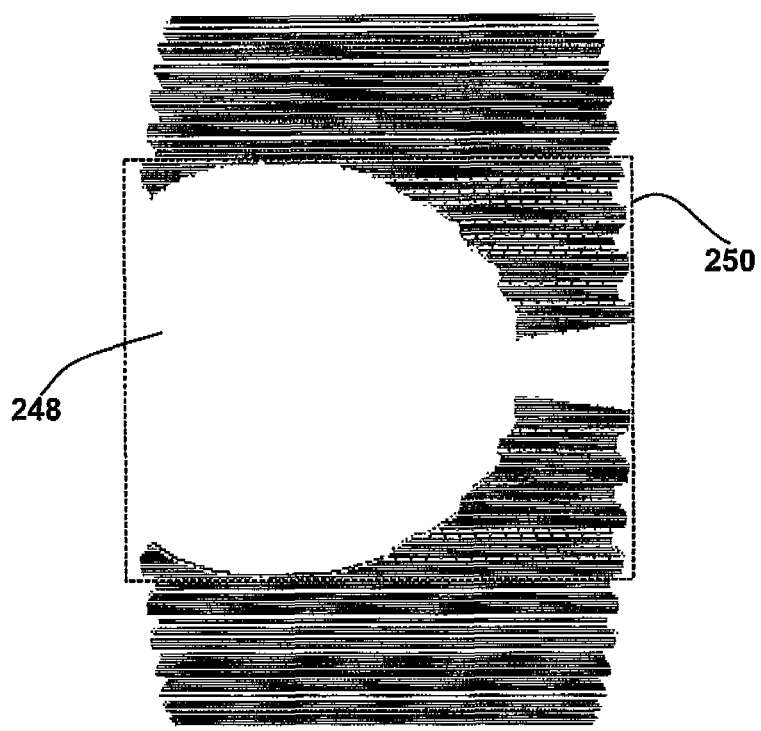
FIG. 12 shows points removed in connection with a protective cowling, and the portion of points removed to counter biases in the rotation estimation.

This counters bias in the rotation value means at 259, that is otherwise caused by the points removed to allow for the presence of the but supports 244 at 247. The temporary removal of points by the temporary point removal means is visually depicted in FIG. 12, which outlines a plan view of example scan cloud data when a protective but 240 has been utilised, and the points attributable to that protective but 248 removed at 247. The points removed in connection with the protective but 240 are depicted in the circular shaded region 248. The shaded region that is bounded by a substantially rectangular shape 250 represents the points which are temporarily removed in this embodiment.

Figure 11:
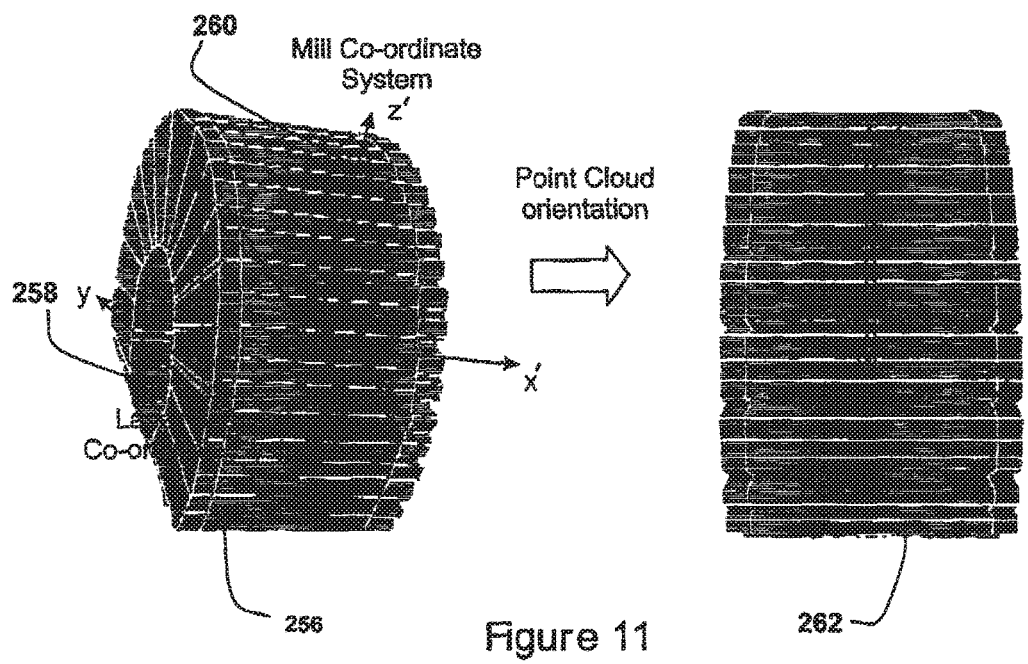
FIG. 11 represents a visual depiction of an alignment process utilised by the data editing means.

The laser scanner 11 is only approximately placed in the middle of the mill, and therefore the longitudinal 252, transverse 254 and height 268 dimensions are also approximated. Accordingly, the internal laser scanner co-ordinate system needs to be aligned with the mill co-ordinate system at 263. An example of this alignment process is visually depicted in FIG. 11. With reference to FIG. 11, the initial scan cloud data 256 is referenced to the laser scanner's co-ordinate system 258, which is arbitrarily positioned and orientated relative to the mill co-ordinate system 260. A scan cloud rotation process at 263 is utilised to align the mill and scanner co-ordinate systems. After the scan cloud rotation process at 263 has completed, the scan cloud data is substantially aligned with the mill co-ordinate system 262.

The scan cloud rotation process requires rotation values to perform the rotation. A rotation values means is utilised to calculate the rotation values at 263. In this embodiment, the rotation values includes a rotation value software utility which firstly uses a translator process to translate the scan cloud data to the centroid at 255 of the remaining data:

$$\begin{pmatrix} x' \\ y' \\ z' \end{pmatrix}_i = \begin{pmatrix} x \\ y \\ z \end{pmatrix}_i - \begin{pmatrix} \bar{x} \\ \bar{y} \\ \bar{z} \end{pmatrix} \text{ where } \begin{pmatrix} \bar{x} \\ \bar{y} \\ \bar{z} \end{pmatrix} = \frac{1}{n} \sum_{i=1}^{n} \begin{pmatrix} x \\ y \\ z \end{pmatrix}_i .$$

The rotation values are then determined via a calculator process using eigenvalue decomposition of the covariance matrix of the scan cloud data:

$$\Lambda = MCM^T$$

where $$C = \sum_{i=1}^{n} \begin{pmatrix} x' \\ y' \\ z' \end{pmatrix}_i (x' \ y' \ z')_i$$

The scan cloud data, including the temporarily-removed points at 257, are then rotated by the scan cloud data rotation process at 259, using the rotation value software utility, according to the rotation values produced by the rotation values means, whereby a rotation process ensures that the x-longitudinal, y-transverse and z-height axes coincide:

$$\begin{pmatrix} x'' \\ y'' \\ z'' \end{pmatrix}_i = M \begin{pmatrix} x' \\ y' \\ z' \end{pmatrix}_i$$

After the completion of the scan cloud data rotation process at 263, the points temporarily removed at 257 are restored into the scan cloud data at 261 using a point restoration means. In this embodiment, the points previously marked by the temporarily point removal means are restored to the accumulated point cloud data.

Another iteration of removing unwanted data is repeated at 265 according to whether each given point's longitudinal co-ordinate exceeds a threshold derived from the mill length, and if applicable, the cone angle:

$$-t_x < x_i < t_x$$

Following the second iteration of the removal of unwanted data at 265, any residual tilts are determined and corrected at 267 using a tilt-correction means, which includes a tilt-correction software utility. The tilt-correction software utility at 267 is actuated on the point cloud data about the transverse at 269 and height at 271 axes.

Figure 13:
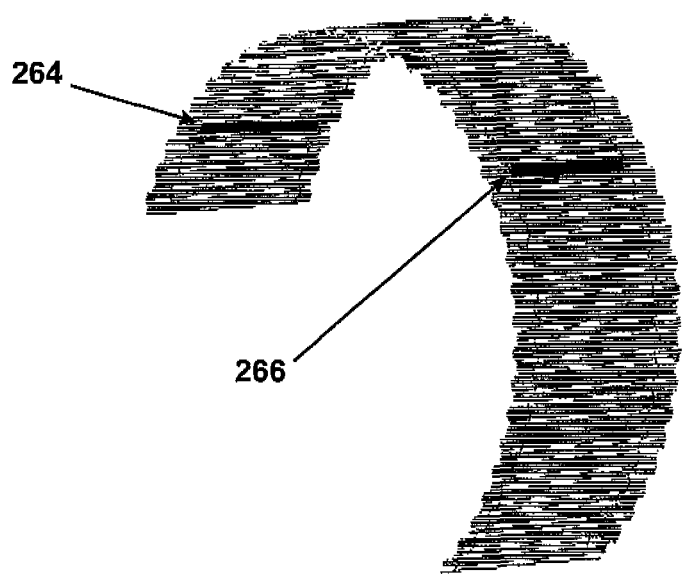
FIG. 13 illustrates a method of determining and correcting the residual tilt about the transverse and height axes.
Figure 14:
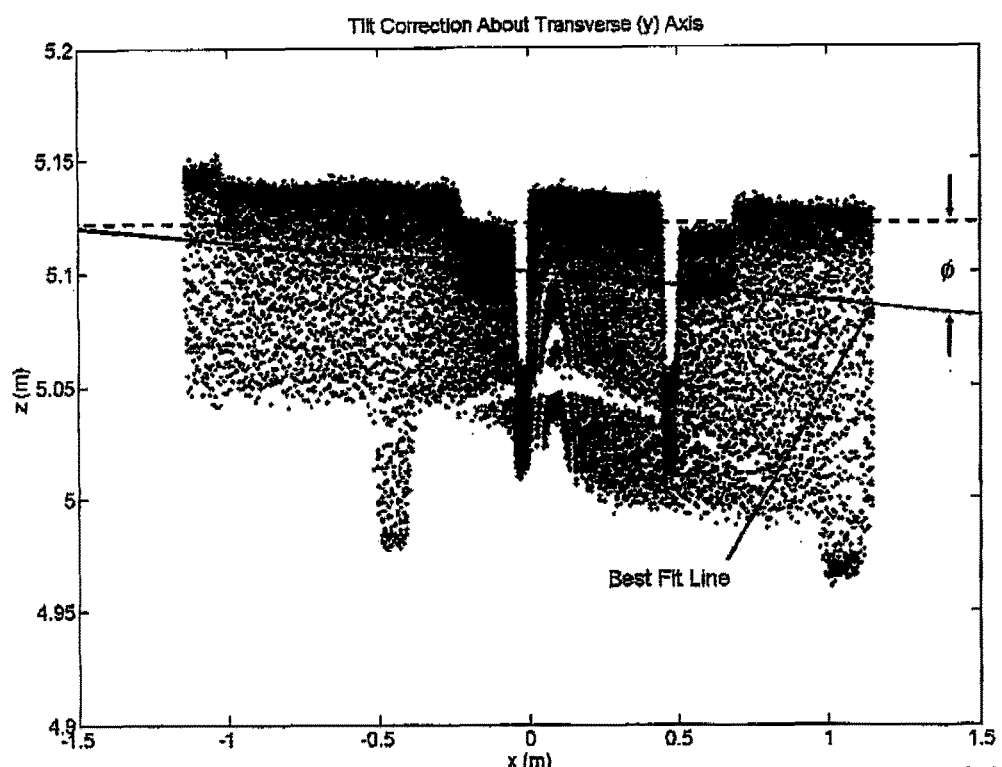
FIGS. 14 and 15 depict the point data used to correct tilt about the transverse and height axis respectively.

With reference to FIG. 13, one type of tilt-correction means is to use a method of determining and correcting the residual tilt about the transverse axis at 269 by firstly isolating a narrow band of points at the top of the mill 266 that are oriented parallel to the longitudinal axis 252, with a view to ensuring these points are substantially level. This process can be actuated as follows:

i. An extractor process extracts a temporary set of points (p) 266 from the belly within the following user-defined constraints:

$$|x_i| < t_x, \ |y_i| < t_y, \ z_i > t_z$$

ii. a subtracter process subtracts the mean x co-ordinate from the extracted set of points:

$$x'_i = x_i - \bar{x} \text{ where } \bar{x} = \frac{1}{p} \sum_{i=1}^{p} x_i$$

iii. For each point in the extracted set of points, form the following 2D line equation:

$$z_i = m x'_i + b$$

iv. a least-squares calculator calculates the least-squares estimate of the slope, m, as $$m = \frac{\sum_{i=1}^{p} z_i x'_i}{\sum_{i=1}^{p} (x'_1)^2}$$

v. a rotate angle calculator process calculates the rotation angle, φ. A figure is provided visually depicting a typical tilt correction around the transverse axis 254 in FIG. 14. The rotation angle φ is calculated as follows $$\phi = \arctan(m)$$

vi. an accumulated scan point rotator process then rotates the accumulated scan point data:

$$\begin{pmatrix} x' \\ y' \\ z' \end{pmatrix}_i = R_2(\varphi) \begin{pmatrix} x \\ y \\ z \end{pmatrix}_i \text{ where } R_2(\varphi) = \begin{pmatrix} \cos\varphi & 0 & -\sin\varphi \\ 0 & 1 & 0 \\ \sin\varphi & 0 & \cos\varphi \end{pmatrix}$$

Figure 15:
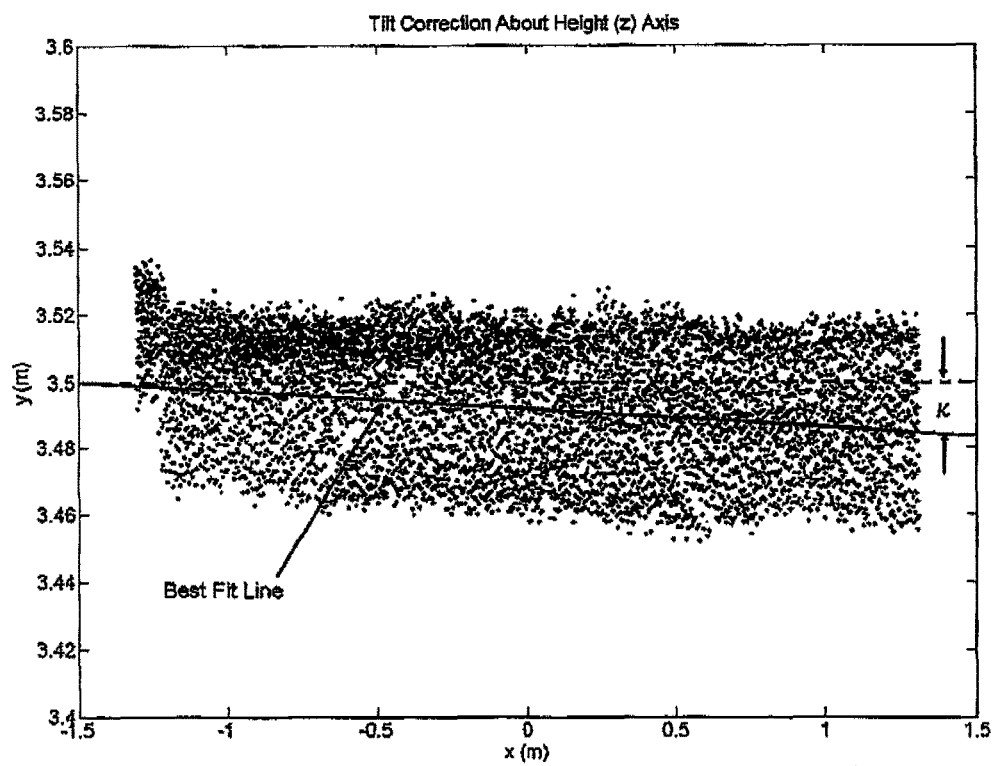

Secondly, isolate a narrow band of points on one side of the mill 264 at the height of the centroid, with a view to ensuring these points are substantially parallel with the longitudinal axis 252. This process can be actuated as follows:

i. Extract a temporary set of points (p) 264 from the belly within the following user-defined constraints:

$$|x_i| < t_x, y_i > t_y, |z_i| < t_z$$

ii. Subtract the mean x co-ordinate from the extracted set of points:

$$x'_i = x_i - \bar{x}$$

where $$\bar{x} = \frac{1}{p} \sum_{i=1}^{p} x_i$$

iii. For each point in the extracted set of points, form the following 2D line equation:

$$y_i = m x'_i + b$$

iv. Calculate the least-squares estimate of the slope, m, as $$m = \frac{\sum_{i=1}^{p} y_i x'_i}{\sum_{i=1}^{p} (x'_i)^2}$$

v. Calculate the rotation angle, κ. A figure is provided visually depicting a typical tilt correction around the height axis 268 in FIG. 15. The rotation angle κ is calculated as follows $$\kappa = \arctan(m)$$

vi. The scan cloud data are then rotated $$\begin{pmatrix} x' \\ y' \\ z' \end{pmatrix}_i = R_3(\kappa) \begin{pmatrix} x \\ y \\ z \end{pmatrix}_i$$

where $$R_3(\kappa) = \begin{pmatrix} \cos\kappa & \sin\kappa & 0 \\ -\sin\kappa & \cos\kappa & 0 \\ 0 & 0 & 1 \end{pmatrix}$$

In the current embodiment, the partitioning means assigns labels to the scan cloud data at 273 as either belonging to a mill end, the ball charge at 270 or the belly at 272.

An opposing-end segmentation means is used to isolate and label the points in the scan cloud data attributable to a mill end at 275, which utilises an end segmentation software utility. The opposing-end segmentation means differs according to whether the base reference data indicates that the mill has planar or conical ends.

Figure 16:
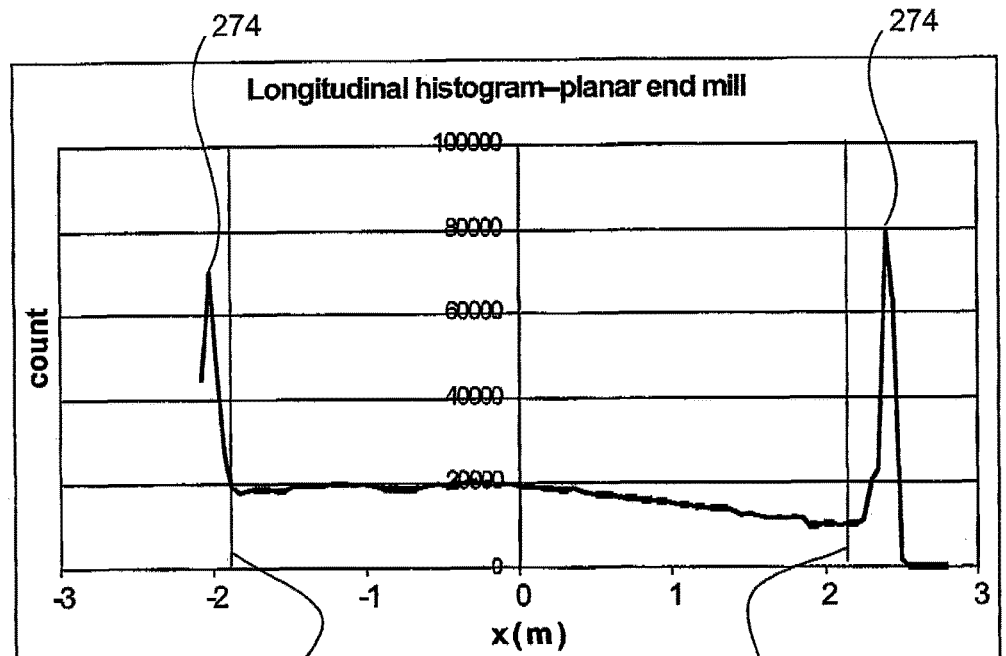
FIGS. 16 and 17 are histograms illustrating a method to segment mill end points for a planar end mill and conical end mill respectively.

In the case of a planar end, a planar-end segmentation means is used. The planar-end segmentation means at 277 uses an end segmentation software utility that calculates the frequency of each longitudinal 252 co-ordinate within the accumulated scan cloud data using a frequency calculator process. This data can be represented as a histogram. An example of a typical histogram of this nature is illustrated in FIG. 16. The left and right peaks represent the greatest said frequency of positive and negative longitudinal coordinates 274. These peaks, which correspond to the mill ends, are located. The peak value locations 274 define, with the addition or subtraction of a pre-defined threshold value by a threshold addition process, are the thresholds 276 for assigning points to either the feed end 282 or the discharge end 284. In this embodiment, the left peak defines the feed end:

$$x_i < x_{p_L}$$

and the right end the discharge end:

$$x_i < x_{p_R}$$

Figure 17:
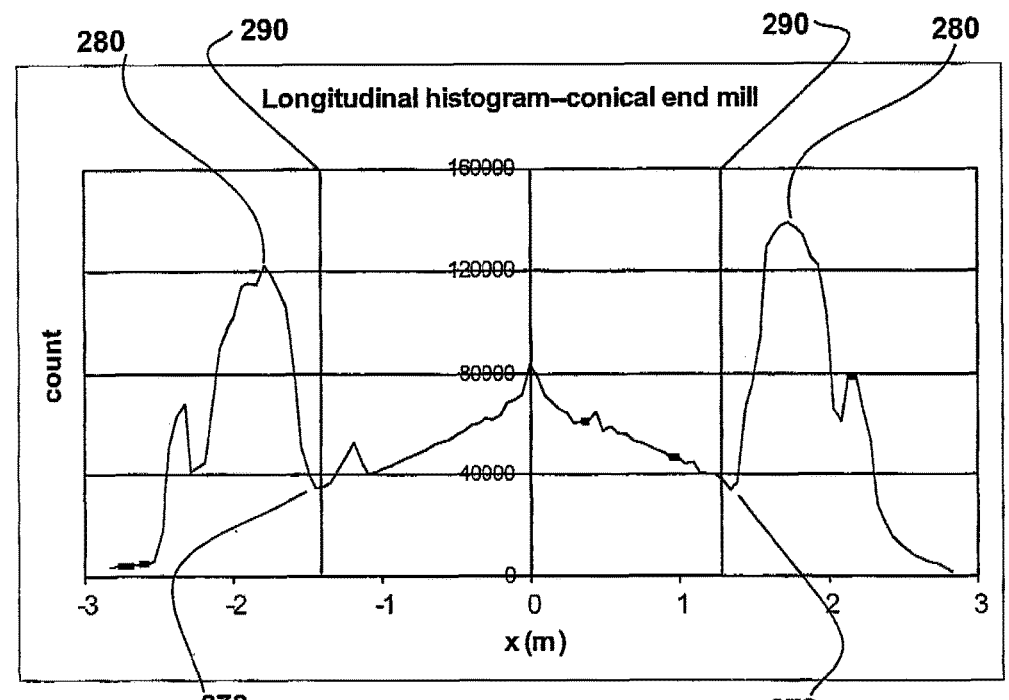

In the case of a conical end, a conical-end segmentation means is used at 279. In this embodiment, the conical-end segmentation means uses a frequency calculator process of the end segmentation software utility to calculate the frequency of each longitudinal 252 co-ordinate within the accumulated scan cloud data. This data can also be represented as a histogram. An example of a typical histogram of this nature is illustrated in FIG. 17. The negative and positive peaks of said frequencies of longitudinal coordinates are calculated 280 by a greatest frequency calculator process.

From these negative and positive peaks 280, the histogram is searched inward by a minima locations calculator process, towards the location of the scanner 11 for the minima locations 278, which correspond to where the conical ends intersect the belly.

The minima locations 278, with the addition or subtraction of a threshold value by a threshold addition process, are used by a segmentation process to define the thresholds 290 for assigning points to the planar ends. In this embodiment, the left minimum location defines the feed end:

$$x_i < x_{m_L}$$

and the right minimum location the discharge end:

$$x_i < x_{m_R}$$

With the scan cloud data corresponding to the mill ends segmented by the opposing-end segmentation means at 275, the points representing the ball charge 270 can be segmented from the scan point data using a floating-object segmentation means that includes a floating-object software utility, to segment points in the accumulated point cloud data attributable to objects that are non-fixably connected to the mill. If a ball charge is present at 345, the data editing means is adapted to identify and segment this portion of the scan cloud data.

Figure 18:
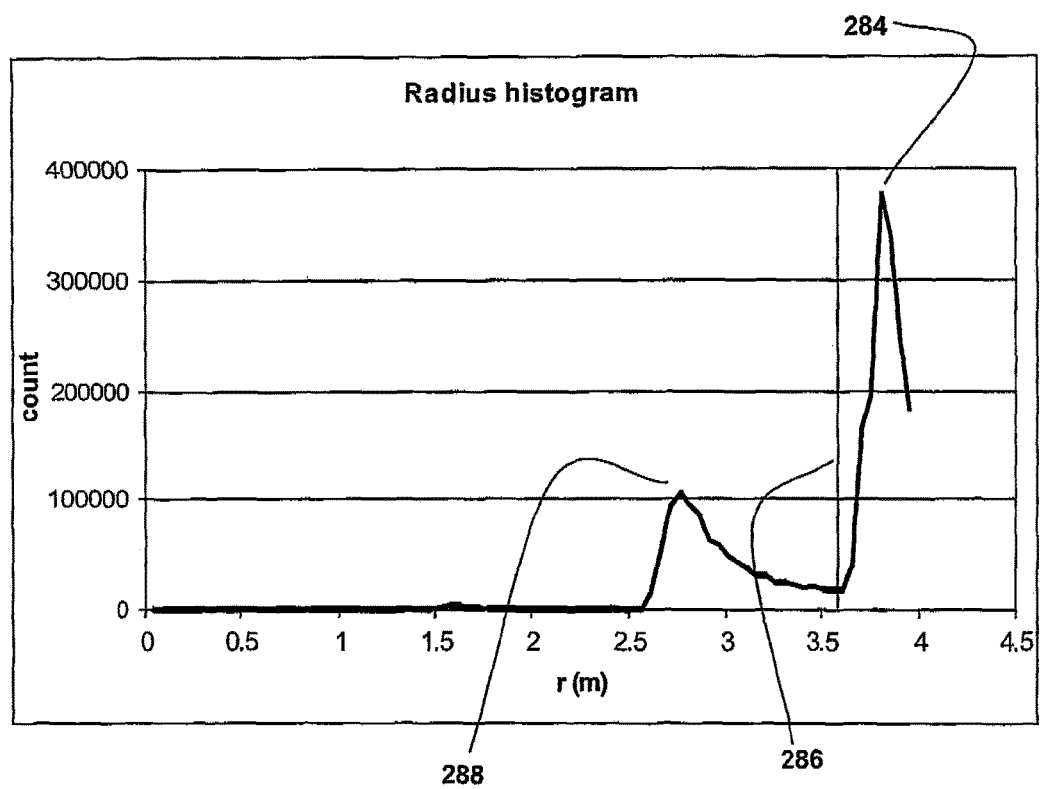
FIG. 18 is a histogram illustrating a method to segment points attributable to the ball charge a given mill.

To identify the ball charge 270 points, a radius frequency calculator calculates the frequency of each cylindrical radius value is calculated at 281 where $r_i = \sqrt{y_i^2 + z_i^2}$ This frequency of each cylindrical radius can be visually depicted via a histogram. An example of a typical histogram of this nature is illustrated in FIG. 18. The greatest frequency of cylindrical radii 284 represents the points of the belly liner 272, as determined by a peak value determinative process. The radius at this peak location 284, with the subtraction of a user-defined tolerance, is used as a threshold 286 for assigning points to the ball charge:

$r_i < r_p$

In our example histogram of FIG. 18, the second lobe from the right 288 comprises ball charge points; smaller lobes on the left of this second lobe 288 comprise points from the tripod, protective but 240 or supporting beam 246 thereof.

Figure 19:
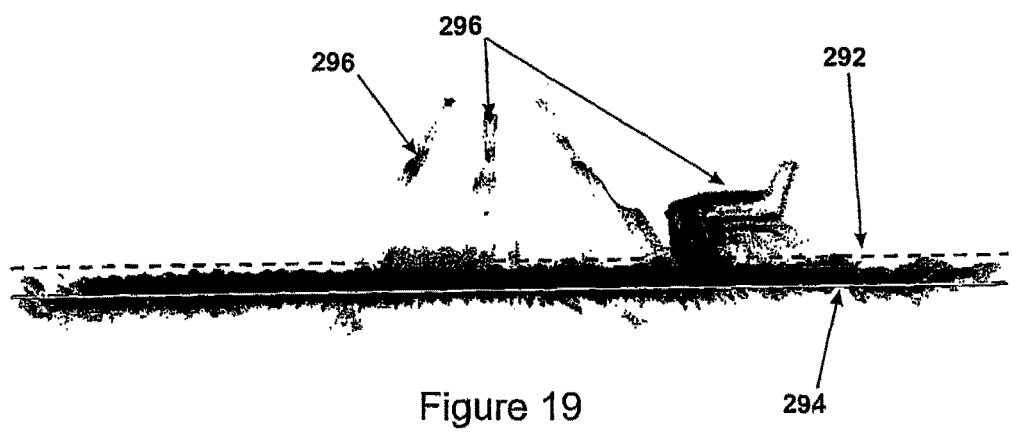
FIG. 19 is a visual depiction of a method of fitting ball charge points to a plane in order to remove unwanted data points.

With reference to FIG. 19, the second step in segmenting the ball charge points at 283 involves:

i. using a segmentation fitting process to fit all ball charge 270 points to a plane by eigenvalue-based decomposition. The Eigenvalue decomposition is as described earlier:

a scan cloud translation process to translate the entire point cloud of m points to the centroid:

$$\begin{pmatrix} x' \\ y' \\ z' \end{pmatrix}_i = \begin{pmatrix} x \\ y \\ z \end{pmatrix}_i - \begin{pmatrix} \bar{x} \\ \bar{y} \\ \bar{z} \end{pmatrix}$$

where $$\begin{pmatrix} \bar{x} \\ \bar{y} \\ \bar{z} \end{pmatrix} = \frac{1}{m} \sum_{i=1}^{m} \begin{pmatrix} x \\ y \\ z \end{pmatrix}_i$$

an eigenvalue decomposition process, to determine the eigenvalue decomposition of the covariance matrix of the ball charge point cloud:

$$\Lambda = MCM^T$$

where $$C = \sum_{i=1}^{n} \begin{pmatrix} x' \\ y' \\ z' \end{pmatrix}_i (x' \ y' \ z')$$

ii. The plane model is given by $ax+by+cz-d=0$ where (a, b, c) are the elements of the eigenvector corresponding to the smallest eigenvalue, and $$d = (a \ b \ c) \begin{pmatrix} \bar{x} \\ \bar{y} \\ \bar{z} \end{pmatrix}$$

iii. using a residual deviation calculation process, to calculate the residual deviation, v, from the best-fit plane for each point:

$ax_i + by_i + cz_i - d = v_i$ iv. using a points discardal process, to discard points above the plane 294 can then be discarded. The points discarded are those residuals larger than twice the standard deviation of residuals and above the plane 292, i.e. interior outliers only:

$v_i < -2\sigma$ where $\sigma$ is the square root of the smallest eigenvalue (Note: the sign of $v_i$ is negative for points above the ball charge surface and positive for points below).

This second step at 283 can then be repeated for one or more iterations at 285 to further refine the ball charge data set. In this embodiment, the process is repeated five times.

The process is visually depicted in FIG. 19. In this example ball charge segment cloud data, the figure depicts:
i. points from tripod legs and unwanted data points 296;
ii. threshold for removing unwanted interior data points 292; and
iii. best fit plane to ball change data 294.

Figure 3:
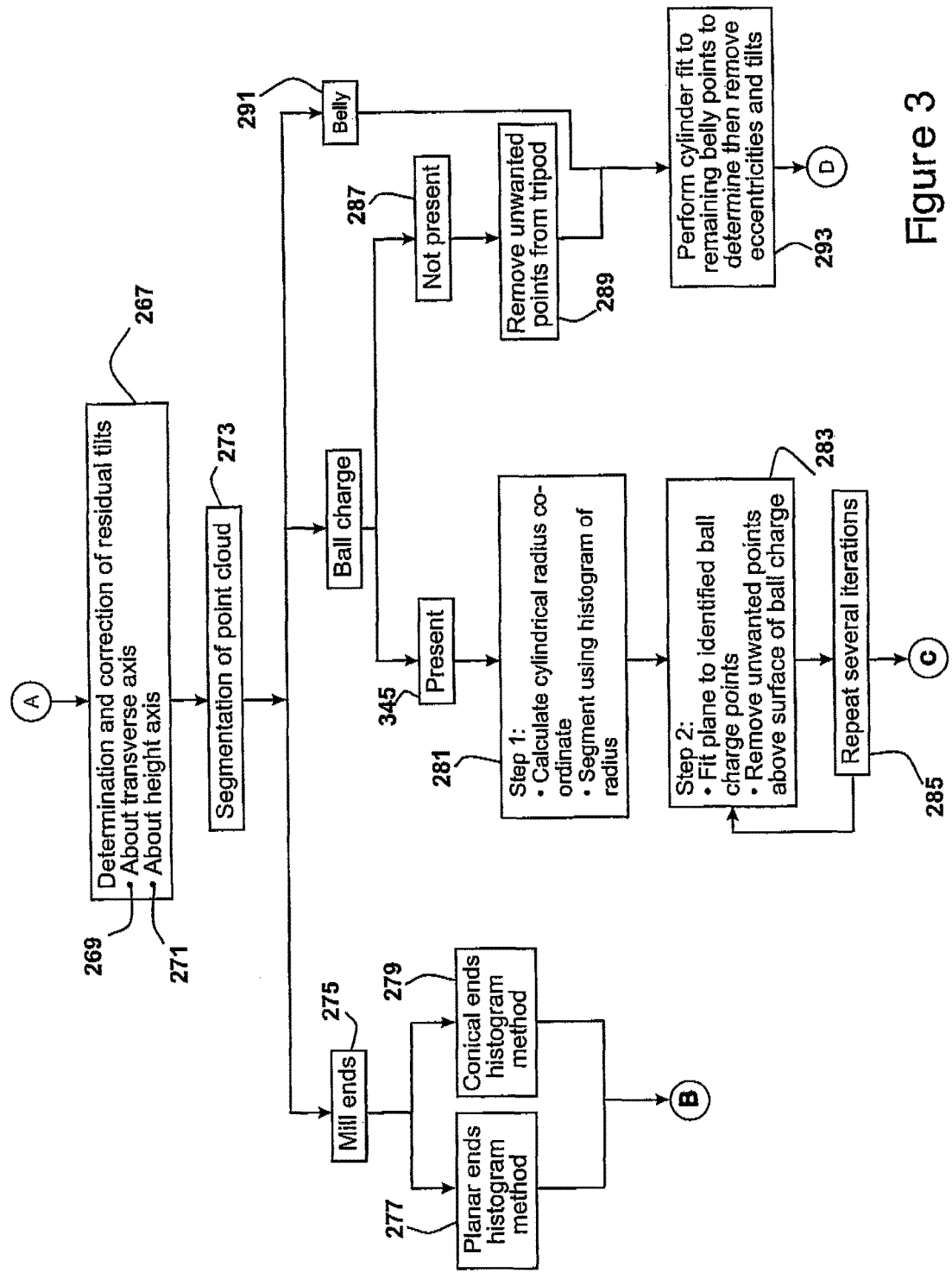

Returning to the data editing means flow chart at FIG. 3, if a ball charge is not present in the scan cloud data at 287, the 'tripod' points, if one was utilised by the laser scanner 11, are removed at 289. In this embodiment, this is achieved by removing a specified cone of points from beneath the laser scanner 11, from the scan cloud data:

$\alpha_i < t_{\alpha_{cone}}$

Having segmented the mill ends and the ball charge points from the scan cloud data, the remaining data are the points corresponding with the belly at 291. A belly segmentation means uses these points as the basis of its calculations, through the utilisation of a belly segmentation software utility.

In this embodiment, the first step of the belly segmentation means is to remove any eccentricity in mill position and tilts by using a cylinder-fit process. In this embodiment, the cylinder-fit process fits a cylinder to all belly points at 293, as shown FIG. 20. The data is then transformed accordingly.

Figure 20:
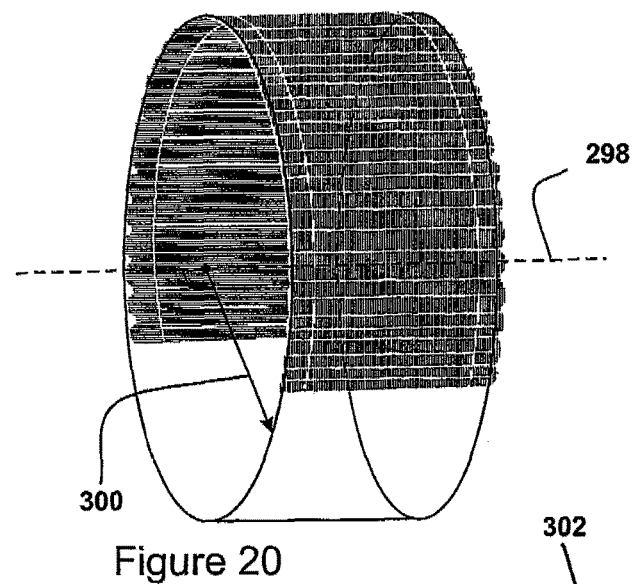
FIG. 20 is a visual depiction of a process of fitting a cylinder to all belly points to correct tilt and remove eccentricities in the scan cloud data.

The cylinder-fit process is illustrated in FIG. 20, and includes a depiction of the best-fit cylinder axis 298 and the best-fit cylinder radius (r) 300. The cylinder-fit process at 293 includes a cylinder-fit software utility, using the following method:

i. for each belly point, the following equation is formed using an equation forming process $\|(\bar{p}_i - \bar{q}) \times \bar{n}\| - r = 0$ where the observation point vector is given by $\bar{p}_i = (x_i \ y_i \ z_i)^T$ the cylinder position vector is given by $\bar{q} = (0 \ y_c \ z_c)^T$ and the cylinder axis vector is given by $\bar{n} = (a \ b \ c)^T$ ii. a weighted constraint addition process, to add the weighted constraint $a^2 + b^2 + c^2 - 1 = 0$ and solve in parametric least squares iii. a cylinder position translation process to translate the entire point cloud by the cylinder position vector $$\begin{pmatrix} x' \\ y' \\ z' \end{pmatrix}_i = \begin{pmatrix} x \\ y \\ z \end{pmatrix}_i - \begin{pmatrix} 0 \\ y_c \\ z_c \end{pmatrix}$$

iv. a rotation value calculator process, to calculate the rotation angles, $\phi$ and $\kappa$:

$$\varphi = \arctan\left(\frac{c}{a}\right) \text{ and } \kappa = \arctan\left(\frac{-b}{a}\right)$$

and a scan cloud transformation process, to transform the entire point cloud $$\begin{pmatrix} x'' \\ y'' \\ z'' \end{pmatrix}_i = M^T \begin{pmatrix} x' \\ y' \\ z' \end{pmatrix}_i$$

where $$M = R_3(\kappa) R_2(\varphi)$$

The next step performed is coarse belly segmentation at 295 whereby points with cylindrical radius less than a tolerance are removed.

$$r_i < t_{r_c}$$

Figure 4:
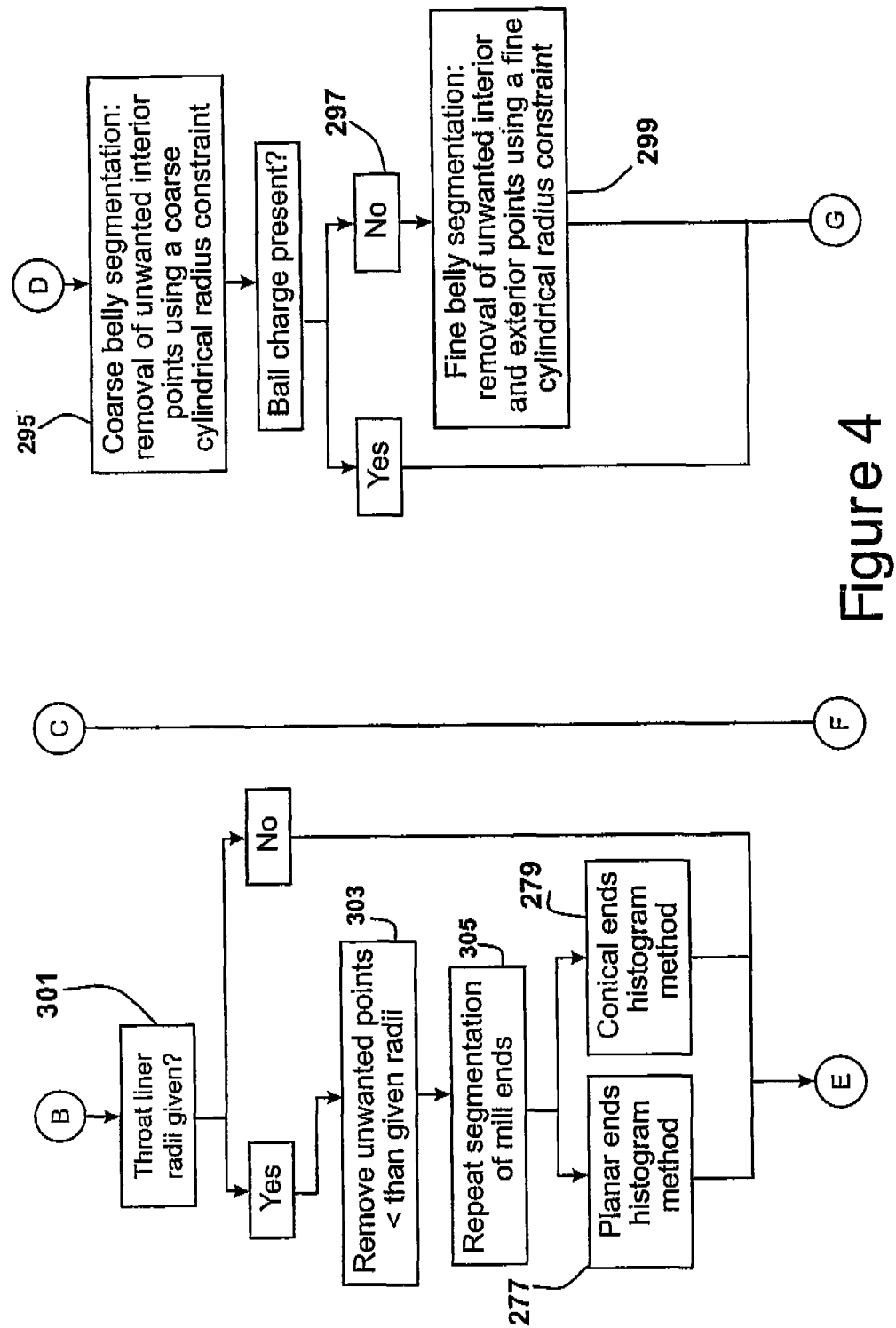
Figure 5:
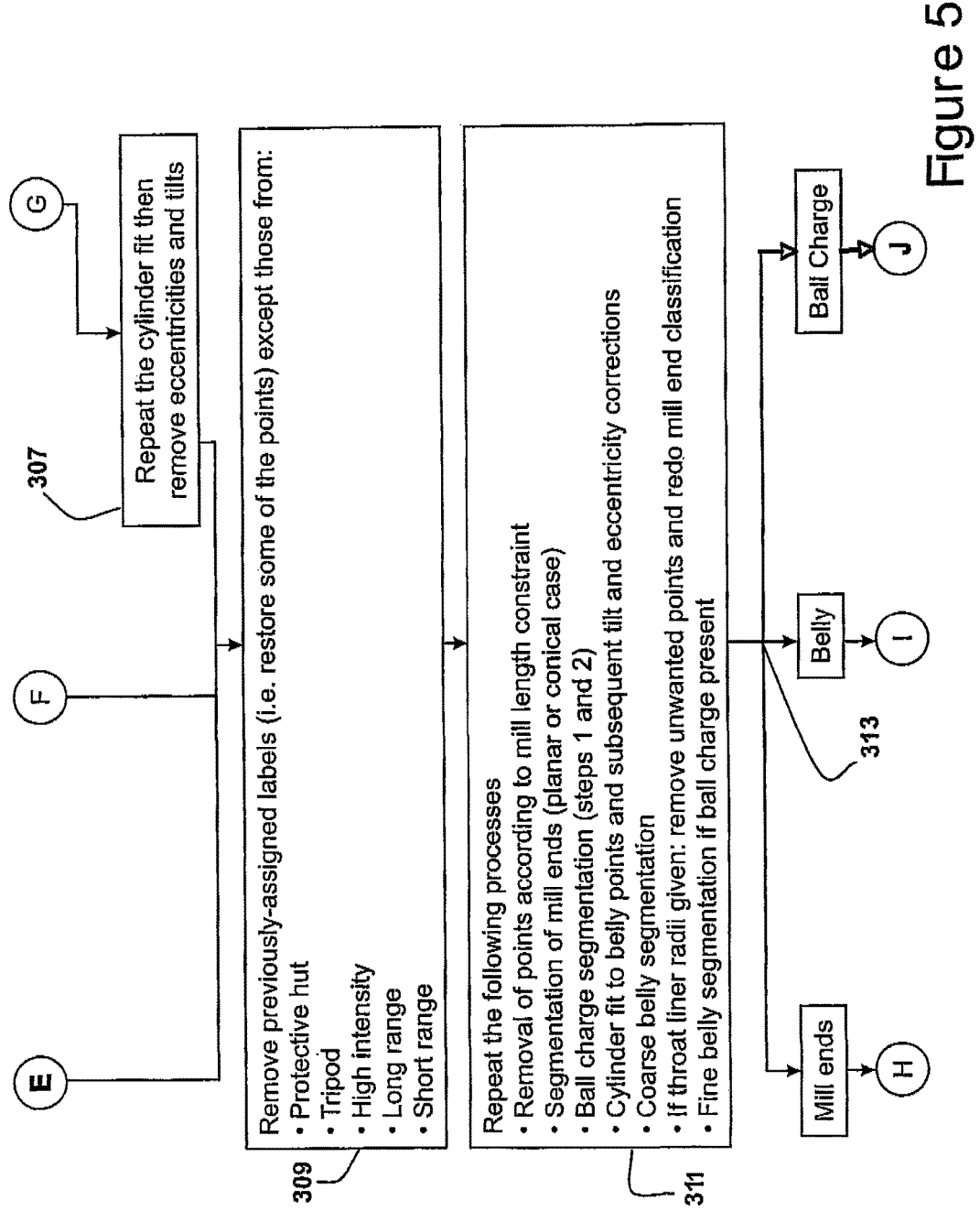
Figure 6:
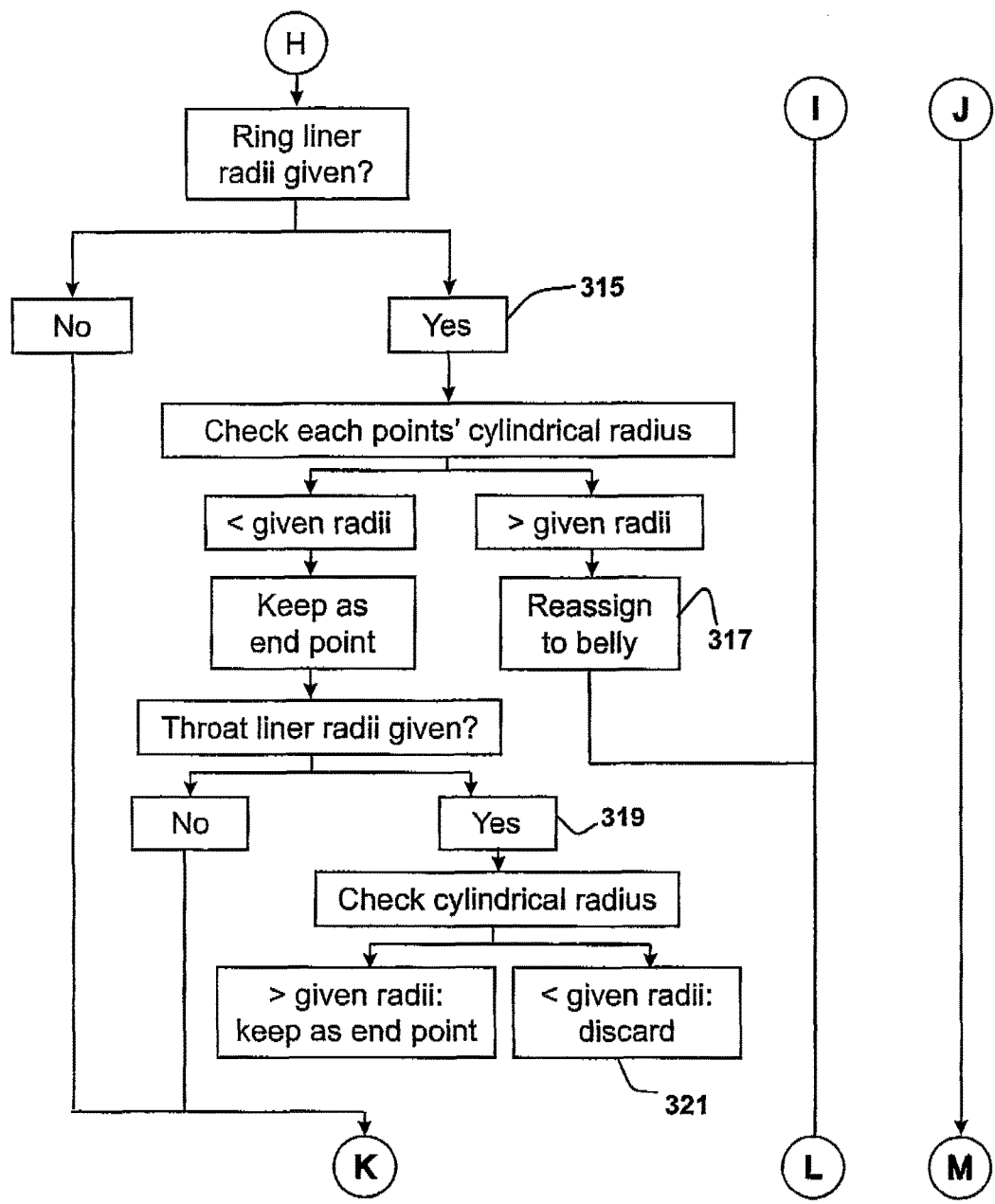

Returning to the flowchart on FIG. 4, if the base reference data includes a throat liner radii at 301, the points of the scan cloud data segmented and marked as a mill end with cylindrical radius less than the specified throat liner radii are removed at 303:

$$r_i < r_{TL}$$

The process of segmenting the mill ends from the scan cloud data into the mill ends, based either on the planar ends method at 277 or the conical ends method at 279, is repeated at 305. The second iteration is more accurate due to the transformation of the scan cloud data in the proceeding period since the first iteration of the segmentation at 275.

Returning to the flowchart on FIG. 4, if there is no ball charge present at 297 in the mill, a fine segmentation of the belly can be performed using a radius-based filter at 299. The method of performing the fine segmentation in this embodiment involves removing any remaining spurious points that lie either insider a radius representing the minimum radius to the liner or points that lie outside of the mill.

$$r_i < t_{r_F} \text{ or } r_i < t_{r_{BOL}}$$

Figure 21:
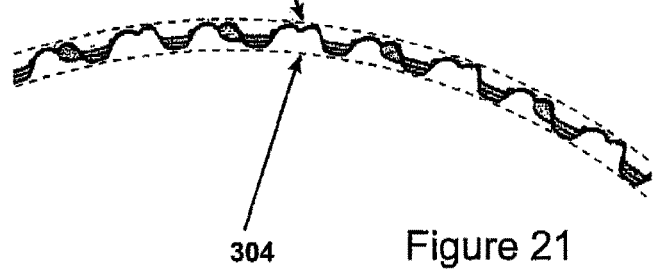
FIG. 21 illustrates a method of fine segmentation of the belly ends using radius-based filters.

This is illustrated in FIG. 21, whereby the arced lines represent the back of liner radius threshold to remove erroneous and/or unwanted data outside the mill 302 and the radius threshold to remove erroneous and/or unwanted data inside the mill 304.

The first step of the belly point segmentation is to remove any eccentricity in mill position and tilts by fitting a cylinder to all belly points at 293 and transforming the data accordingly is then repeated at 307.

With the scan cloud data more accurately orientated, the points which were previously segmented, removed or assigned a label are restored to a single scan cloud data set 309, except those points previously removed in connection with:
i. the protective but 240 at 247;
ii. points from the tripod legs 296 at 289;
iii. the intensity threshold value at 249;
iv. a defined distance range the measured range with a maximum at 251 and minimum at 253 threshold derived from the mill radius and mill length of the base reference data.

The following previously described steps are then repeated at 311:
i. Remove points within the scan cloud data by comparing the measured range with a maximum at 251 and minimum at 253 threshold derived from the mill radius and mill length of the base reference data;

ii. the process labelling the points in the scan cloud data attributable to a mill end at 275;
iii. if a ball charge is present, identify and segment this portion of the scan cloud data at 345;
iv. remove any eccentricity in mill position and tilts by fitting a cylinder to all belly points and transforming the data accordingly at 293.
v. coarse belly segmentation at 295 whereby points with cylindrical radius less than a tolerance are removed
vi. if the base reference data includes a throat liner radii at 301:
  a. the points of the scan cloud data segmented and marked as a mill end with cylindrical radius less than the specified throat liner radius threshold 308 are removed at 303; and
  b. The process of segmenting the mill ends from the scan cloud data into the mill ends, based either on the planar ends method at 277 or the conical ends method at 279.
vii. if no ball charge is present, perform a fine segmentation of the belly ends using a radius-based filter at 299

At the completion of these iterations, the scan cloud data is therefore segmented into that attributable to the mill ends, the belly and the ball charge (if a ball charge is present) at 313. Returning to FIG. 6, and with reference to FIG. 45, if the base reference data includes ring liner radii at 315, points in a mill end segmentation that are greater than the ring liner radius threshold 306 are reassigned to the belly point segmentation at 317 $r_i > r_{RL}$.

If the base reference data includes throat liner radii at 319, points in a mill end segmentation that are less than the throat liner radius threshold 308 are removed from the scan cloud data at 321 $r_i > r_{RL}$.

Figure 7:
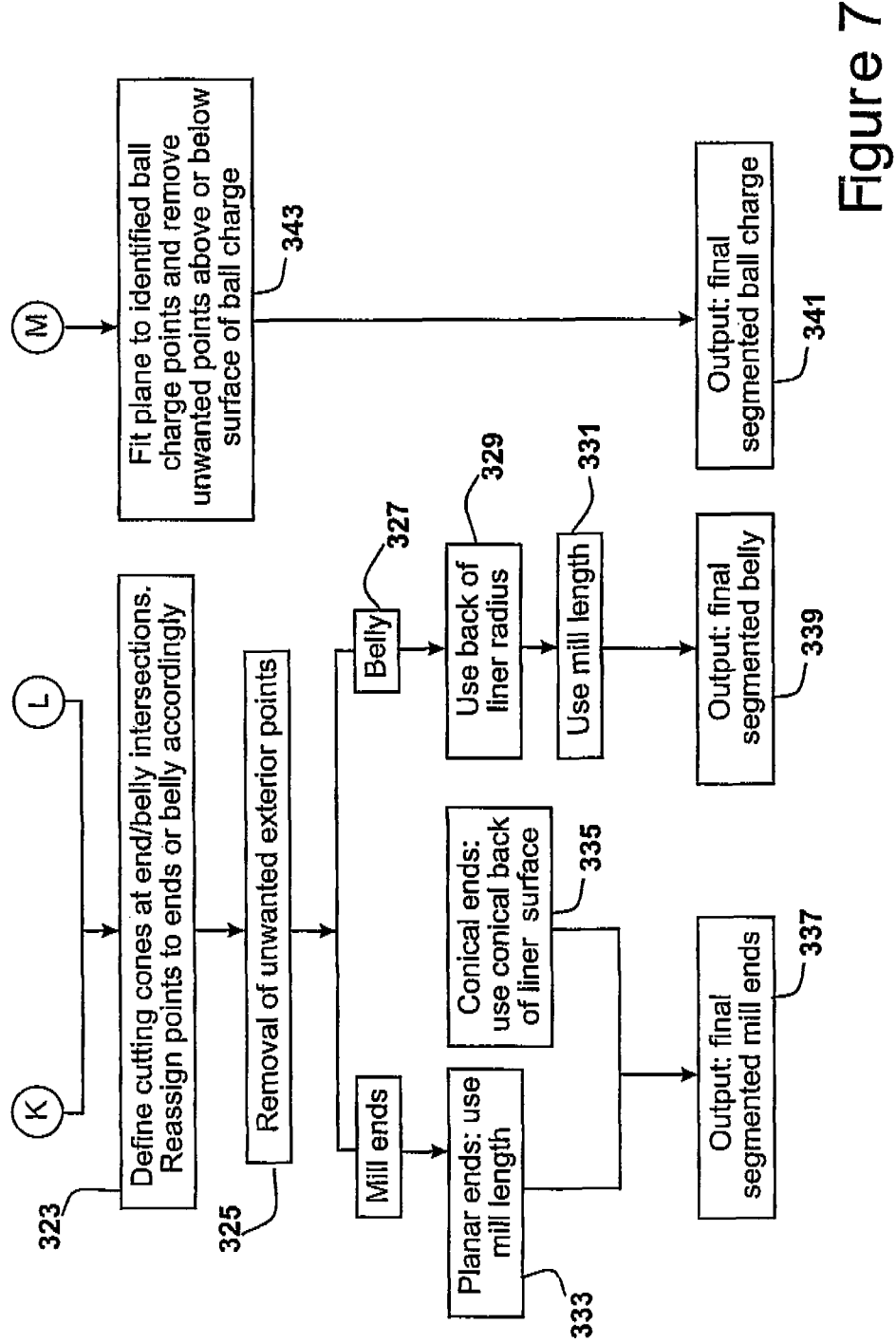
Figure 10A:
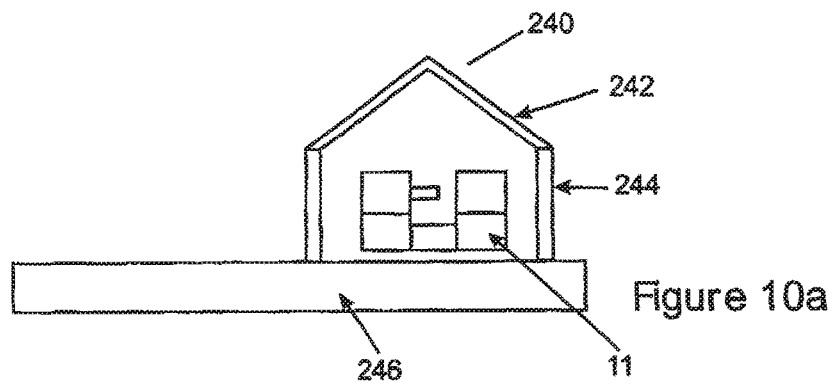
FIGS. 10a and 10b are diagrams showing a protective cowling utilised to shelter a laser scanner from errant falling debris, in profile and plan view respectively.
Figure 10B:
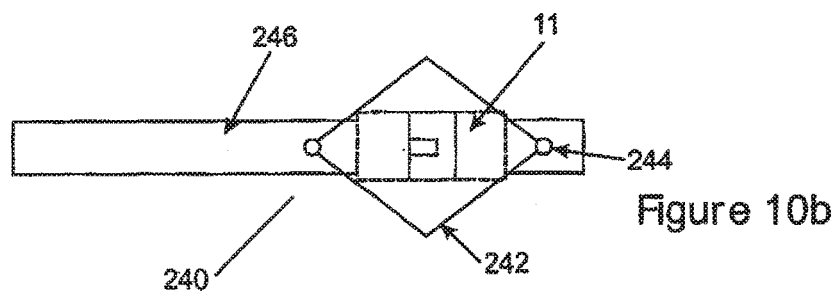
Figure 24:
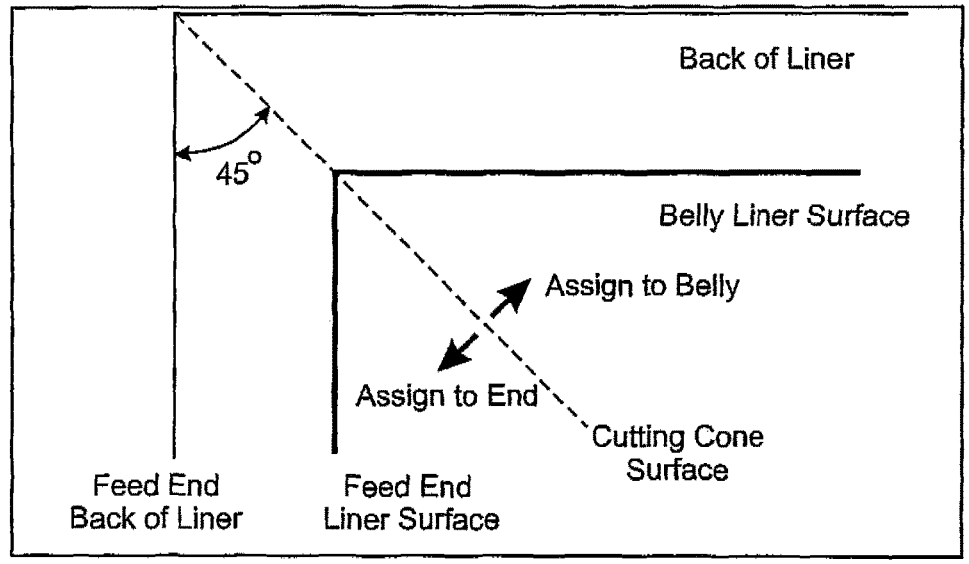
FIG. 24 visually depicts a method of utilising a cone shape to further refine the segmentation of points between the mill ends and the belly.

With reference to FIG. 7, the belly segmentation means also includes a method of utilising a cone shape to further refine the segmentation of points between the mill ends and the belly is provided at 323. In this embodiment, this method of further refinement is achieved by the following steps:
i. a centroid refiner process, to refine centroid of point cloud in the longitudinal dimension by calculating the mean value at either end of the belly point cloud using an equal number of points (to avoid bias)

$$\bar{x}_L = \frac{1}{p^-} \sum_{i=1}^{p^-} x_i^- \text{ such that } \frac{p^-}{n} \geq t_p$$

and $$\bar{x}_R = \frac{1}{p^+} \sum_{i=1}^{p^+} x_i^+ \text{ such that } \frac{p^+}{n} - \frac{p^-}{n} \leq t$$

where $^-$ and $^+$ refer to points from the left and right ends of the belly liner point cloud, respectively;
ii. a scan cloud translation process to translate the entire point cloud by the means of these two means $$x_i' = x_i - \bar{x} \text{ where } \bar{x} = \frac{\bar{x}_L + \bar{x}_R}{2}$$

iii. a circle definition process, to define a circle being the circle of intersection of the back-of-linear (BOL) cylindrical belly surface and the BOL conical or planar end surface
iv. a cone definition process, to define a cone with this circle as the base and apex on the belly side of the circle having half-apex angle of 45°. A visual depiction of a cone of this type is provided in FIG. 24.

v. a point assignment process, to assign points within the cone to the given mill end; those outside are assigned to the belly.

Having further refined the belly and mill end point segmentation of the scan cloud data, a final removal of unwanted exterior points can be performed at 325.

For the segmented belly points at 327, points whose cylindrical radius exceeds the specified BOL radius are removed at 329: $r_i > r_{BOL}$ Points whose absolute value of the longitudinal co-ordinate exceeds half the specified mill length are also removed at

331: $|x_i| > \dfrac{L}{2}$

In the case of a planar end mill, points whose absolute value of the longitudinal co-ordinate exceeds half the specified mill length are removed at

333: $|x_i| > \dfrac{L}{2}$

Figure 25:
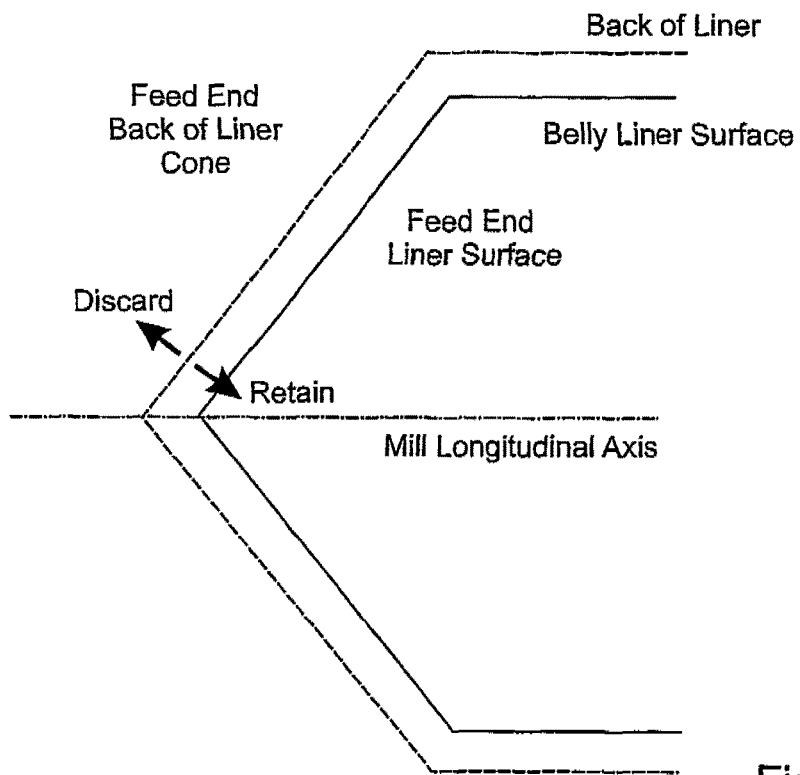
FIG. 25 visually depicts a method of data point refinement for a conical end mill using a cone of the back-of-liner surface.

In the case of conical end mill, construct the apex point located one-half of the known mill length from the mill centre. From the apex point, construct the cone of the BOL surface given the design data cone angle. This method is visually depicted in FIG. 25. Points belonging to the mill end, but falling outside of this cone, are removed at 335.

Figure 22:
FIG. 22 visually depicts ball charge points being fit to a plane to remove unwanted data points.
Figure 23:
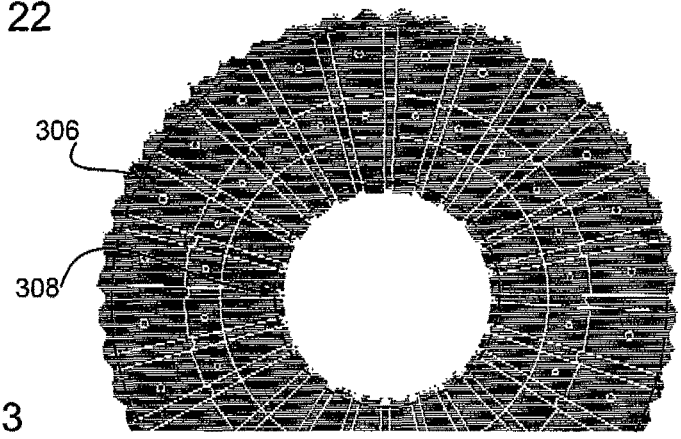
FIG. 23 visually depicts a method of using the ring and throat liner radii to refine the segmentation of the data points.

If a ball charge 282 is present, a final refinement is performed at 343. With reference to FIG. 22, the following process is repeated several times:

i. All ball charge points are fit to a plane 310 by eigenvalue-based decomposition, as previously described at 283;

ii. Outlier tolerance of 3 times the standard deviation of residuals is used to remove points above and below the best-fit plane 312 $|v_i| < 3\sigma$ These steps at 343 can then be repeated for one or more iterations to further refine the ball charge data set. In the present embodiment, the process is repeated once.

The final output from the data editing means are sets of points attributable to the mill ends at 337 (illustrated in FIGS. 8b and 8c), the belly at 339 (illustrated in FIG. 8a) and the ball charge at 341, if present (illustrated in FIG. 8d).

In the case of the mill utilising a secondary grinding system, the volume of these objects that are non-fixably connected to the surface can be advantageously measured by the provision of a non-fixably connected volume measurement means. Two types of non-fixably connected objects that may be present in a mill are a set of balls and pieces of ore, which collectively constitute what is referred to here as the ball charge.

In such instance, the data processing system includes a ball charge volume measurement means. The ball charge volume measurement means works on the principle that the set of points representing the surface of the ball charge, previously obtained through the data segmentation means, are modelled by a least-squares fit polynomial or other suitable model represented by the function f(X, Y, Z). The volume of the ball charge, VBc, is then measured by calculating the volumetric difference between the surface (f(XYZ)) and the best-fit cylinder, c, between the mill ends, i.e.

$$V_{BC} = \int\int\int_V [f(X, Y, Z) - c(X, Y, Z)] dV$$

The processing software 19 also includes a ball-ore discrimination means to determine the ratio of balls to ore. According to the ball-ore discrimination means, each point in the set of points representing the surface of the ball charge is classified as belonging to either a ball or a piece of ore through curvature analysis. For each point in this set a subset of pre-defined number of points, k, that are situated in its immediate neighbourhood are located. Local curvature measures, including principal curvatures and change of curvature, are calculated from this subset. A point is labelled as belonging to a ball if its principal curvatures are equal within a pre-defined tolerance; otherwise it belongs to a piece of ore. Constant change of curvature within the neighbourhood is used as a further criterion for the labelling.

A further analysis is conducted by ball-analysing means at each point within its neighbourhood of k points so as to group together adjacent points belonging to the same label (i.e. ball or ore). Change of curvature is used in this analysis to identify the boundaries between adjacent balls. The result is a number of subsets of data comprising points on individual balls, and a number of subsets of data comprising points on pieces of ore.

These subset data results are used to estimate the composition of the matter below the surface scan, by factoring the distance between the liner and the surface of the ball charge, and the geometry of the mill In an alternative embodiment, a more accurate estimate is achieved by using the top surface data cloud as the basis of an analysis of the likely composition of the remainder of the ball charge underneath.

The data processing system also includes a ball size measurements means to calculate the size of the balls in the mill. For each of the subsets of ball points, the size of the ball can be measured as follows. Least-squares is used to fit the subset data to a sphere whose analytical model is given by $$(X_i - X_c)^2 + (Y_i - Y_c)^2 + (Z_i - Z_c)^2 - R^2 = 0$$

where $(X_i, Y_i, Z_i)$ are the co-ordinates of point i belonging to the subset, $(X_c, Y_c, Z_c)$ are the co-ordinates of the sphere centre and R is the sphere radius. R and $(X_c, Y_c, Z_c)$ constitute the parameters to be estimated from the subset data.

Many mills are fitted with load-cells or other devices that measure the total mass, $M_T$, of the mill and its contents. This mass comprises the mass of the liners, $M_L$, mass of the ball charge, $M_{BC}$, and the mass of the other mill elements (bearings, shell, bolts, etc.), $M_E$:

$$M_T = M_{BC} + M_L + M_E$$

The mass of the other mill elements, $M_E$, is one of the known design parameters. The mass of the mill liners is calculated from the mill liner density, $\rho_L$, which is one of the known design parameters, and the mill liner volume, $V_L$:

$$M_L = \rho_L V_L$$

The mill liner volume is calculated by integration of the already-obtained liner thickness measurements over the visible surface of the mill, which may be incomplete, in which case it is multiplied by an appropriate factor to obtain the volume for the complete mill. Thus, the mass of the ball charge can be calculated as $$M_{BC} = M_T - \rho_L V_L - M_E$$

The mass of the ball charge is further decomposed into that of the ore, $M_{ore}$, and that of the balls, $M_{balls}$, $$M_{BC} = M_{ore} + M_{balls}$$

The densities of the ore, $\rho_{ore}$, and balls, $\rho_{balls}$, are known design parameters, so the ball charge mass can be expressed as $$M_{BC} = \rho_{ore} V_{ore} + \rho_{balls} V_{balls}$$

Furthermore, the volume of the ball charge is known from the Ball Charge Measurement Means:

$$V_{BC} = V_{ore} + V_{balls}$$

Thus, the volumes of the ore and balls can be determined from these two equations and used to calculate the ball-to-ore ratio.

The discharge end liner contains holes to allow crushed ore to pass through. In some mills these holes are much smaller than the diameter of the balls, whereas in others they are much larger (i.e. comparable in size to the balls) and their measurement is important.

In this instance, the data processing system includes a hole measurement means to measure the size of apertures in the surface of the mill. The discharge end holes may be arranged in a number of sectors radiating outward from the centre 341, as shown in FIG. 26a.

Since the pattern of grate holes repeats around the discharge end, initial data processing is restricted to a region equal in angular width to one sector, as depicted in FIG. 26b.

Data edges are detected within that sector using local curvature analysis, eigenvalue analysis, intensity analysis or a combination thereof. All edge points corresponding to one particular grate hole are assembled together as a subset of the point cloud data. FIG. 27a shows a segmented point cloud data of the discharge end, and FIG. 27b shows the same point cloud data with detected edges for one grate hole 343. From this subset the minimum and maximum widths are calculated. This is repeated for all grate holes in the sector. The procedure is then repeated for all holes in the next grate sector.

It should be appreciated that the scope of the present invention is not limited to the specific embodiment described herein. Importantly, the invention is not limited to mapping and measuring thickness of mill liners in any of the available mill types. Indeed, other embodiments may be envisaged using the same principles applied to mapping and/or measuring surface displacement relative to a reference in other applications such as vessels and structures particularly common to industrial installations.

The claims defining the invention are as follows:

1. A system for orientating point cloud data of a first surface of an object relative to base reference data of a structure, the first surface of the object and the base reference being referenced to their own respective co-ordinate systems, the system comprising:
    an input source generator adapted to provide the point cloud data of the first surface;
    a tilt-correction means for orientating the point cloud data of the first surface relative to the base reference data of the structure, wherein the tilt-correction means includes a point cloud data orientation means, such that the co-ordinate system of the point cloud data aligns with the co-ordinate system of the base reference data;
    a data editing means for filtering spurious point data from the point cloud data of the first surface; and
    wherein the base reference data of the structure comprising key reference data which describes the geometry of the base reference of that structure, the base reference having a second surface, the second surface of the base reference being substantially distinct from the first surface, whereby after orientation of the point cloud data with the base reference data the distance between the first surface of the object and the second surface of the structure can be calculated.

2. A system in accordance claim 1, wherein the data editing means further includes partitioning means for partitioning the point cloud data into discrete segments corresponding to different geometrically described sections of the first surface.

3. A system in accordance with claim 2, wherein the data editing means includes at least one of a scanner structure filter, an intensity filter, and a range filter:
    (i) wherein the scanner structure filter is configured to remove a first point attributable to a supporting means for at least one of situating, stabilizing, and protecting the input source generator;
    (ii) wherein the intensity filter is configured to remove a second point in the point cloud data above a threshold intensity value; and
    (iii) wherein the range filter is configured to remove a third point that is one of less than a minimum and greater than a maximum threshold in the point cloud data.

4. A system in accordance with claim 3, where the base reference data includes a radius variable and a length variable, and wherein the range filter derives the threshold from the radius variable and the length variable.

5. A system in accordance with claim 2, wherein the partitioning means includes at least one of an opposing-end segmentation means, a floating-object segmentation means for segmenting points in the point cloud data attributable to objects that are non-fixably connected to the first surface, and a belly segmentation means for segmenting points in the point cloud data attributable to a substantially cylindrical shell wherein the opposing-end segmentation means includes at least one of a planar-end segmentation means for segmenting points in the point cloud data when the base reference data denotes a substantially planar end, and a conical-end segmentation means for segmenting points in the point cloud data when the base reference data denotes a substantially conical end.

6. A system in accordance with claim 1, wherein the data editing means is adapted to operate prior to the tilt-correction means.

7. A system in accordance with claim 1, wherein the tilt-correction means includes a tilt-correction software utility for determining and correcting any residual tilt in the point cloud data about an axis comprising:
    an extractor process to extract a temporary set of points, p, within a set of constraints:

$$|x_i| < t_x, |y_i| < t_y, z_i > t_z$$

a subtracter process to subtract a mean x co-ordinate from the temporary set of points:

$$x'_i = x_i - \bar{x} \text{ where } \bar{x} = \frac{1}{p}\sum_{i=1}^{p} x_i$$

forming the following 2D line equation for each point in the resulting temporary set of points:

$$z_i = mx_i' + b$$

a least-squares calculator to calculate the least-squares estimate of the slope, m, as:

$$m = \frac{\sum_{i=1}^{p} z_i x_i'}{\sum_{i=1}^{p} (x_i')^2}$$

a rotate angle calculator process to calculate a rotation angle $\phi$ as:

$$\phi = \arctan(m); \text{ and}$$

an accumulated scan point rotator process to rotate the accumulated scan point data:

$$\begin{pmatrix} x' \\ y' \\ z' \end{pmatrix}_i = R_2(\varphi) \begin{pmatrix} x \\ y \\ z \end{pmatrix}_i \text{ where } R_2(\varphi) = \begin{pmatrix} \cos\varphi & 0 & -\sin\varphi \\ 0 & 1 & 0 \\ \sin\varphi & 0 & \cos\varphi \end{pmatrix}.$$

8. A system in accordance with claim 1, further including a non-fixably connected volume measurement means, for measuring the volume of objects that are non-fixably connected to the first surface.

9. A system in accordance with claim 8, wherein the non-fixably connected volume measurement means further comprises a ball-ore discrimination means for measuring the ratio of a set of balls to non-ball materials.

10. A system in accordance with claim 8, wherein the non-fixably connected volume measurement means further comprises a ball size measurement means to measure the size of a set of balls within a cylindrical shell.

11. A system in accordance with claim 1, further including a hole measurement means for measuring the size of apertures in the first surface.

12. A system in accordance with claim 1, wherein the base reference represents a contained space.

13. A system in accordance with claim 12, wherein the contained space is bounded by a substantially cylindrical shell with opposing ends.

14. A system in accordance with claim 13, wherein the base reference further comprises parameters defining a location of a central longitudinal axis of the shell, a radius of the shell, and a length of a cylindrical portion of the shell.

* * * * *